US005794207A

United States Patent [19]
Walker et al.

[11] Patent Number: 5,794,207
[45] Date of Patent: Aug. 11, 1998

[54] METHOD AND APPARATUS FOR A CRYPTOGRAPHICALLY ASSISTED COMMERCIAL NETWORK SYSTEM DESIGNED TO FACILITATE BUYER-DRIVEN CONDITIONAL PURCHASE OFFERS

[75] Inventors: Jay S. Walker, Ridgefield, Conn.; Bruce Schneier, Oak Park, Ill.; James A. Jorasch, Stamford, Conn.

[73] Assignee: Walker Asset Management Limited Partnership, Stamford, Conn.

[21] Appl. No.: 707,660

[22] Filed: Sep. 4, 1996

[51] Int. Cl.$^6$ ................................................. G06F 15/20
[52] U.S. Cl. .................... 705/23; 705/26; 380/49; 380/23; 380/25
[58] Field of Search ..................... 395/226, 227, 395/237, 238, 239, 244; 380/23, 24, 25, 49; 705/26, 27, 37, 38, 39, 44, 1, 5, 6

[56] References Cited

U.S. PATENT DOCUMENTS

| | | | |
|---|---|---|---|
| 4,247,759 | 1/1981 | Yuris et al. | 235/381 |
| 4,449,186 | 5/1984 | Kelly et al. | 395/205 |
| 4,553,222 | 11/1985 | Kurland et al. | 395/215 |
| 4,789,928 | 12/1988 | Fujisaki | 364/401 |
| 4,799,156 | 1/1989 | Shavit et al. | 395/226 |
| 4,903,201 | 2/1990 | Wagner | 364/408 |
| 5,021,953 | 6/1991 | Webber et al. | 364/407 |
| 5,168,446 | 12/1992 | Wiseman | 395/237 |
| 5,191,613 | 3/1993 | Graziano et al. | 380/25 |
| 5,557,518 | 9/1996 | Rosen | 364/408 |

OTHER PUBLICATIONS

Raymond T. Nimmer, "Electronic Contracting: Legal Issues," 14 *J. Marshall J. Computer & Info. L.* 211 (1996).
American Law Institute, Draft–Uniform Commercial Code Revised Article 2 (Sales), Parts 2, 3, and 7, pp. 1–15, Jan. 4, 1996, printed from http://www.kentlaw.edu/ulc/uniform/uc-cart2/chapt2/ucc2c237.html.

Richard E. Speidel & Lee A. Schott, "Impact of Electronic Contracting on Contract Formation Under Revised UCC Article 2, Sales," C878 *ALI–ABA* 335, Dec. 9, 1993.

Jeffrey B. Ritter, "Scope of the Uniform Commercial Code: Computer Contracting Cases and Electronic Commercial Practices," 45 *Bus. Law.* 2533 (Aug. 1990).

Laura Del Rosso, "Marketel Says it Plans to Launch Air Fare 'Auction' in June," *Travel Weekly*, Apr. 29, 1991.

Jeff Pelline, "Travelers Bidding on Airline Tickets; SF Firm Offers Chance for Cut-rate Fares," *San Francisco Chronicle*, Section A4, Aug. 19, 1991.

Michael Schrage, "An Experiment in Economic Theory; Labs Testing Real Markets," *The Record* Section B1, Nov. 26, 1989.

Laura Del Rosso, "Ticket-Bidding Firm Closes it Doors," *Travel Weekly*, Mar. 12, 1992.

(List continued on next page.)

*Primary Examiner*—Thomas H. Tarcza
*Assistant Examiner*—Pinchus M. Laufer
*Attorney, Agent, or Firm*—Morgan & Finnegan LLP; Jeffrey L. Brandt

[57] ABSTRACT

The present invention is a method and apparatus for effectuating bilateral buyer-driven commerce. The present invention allows prospective buyers of goods and services to communicate a binding purchase offer globally to potential sellers, for sellers conveniently to search for relevant buyer purchase offers, and for sellers potentially to bind a buyer to a contract based on the buyer's purchase offer. In a preferred embodiment, the apparatus of the present invention includes a controller which receives binding purchase offers from prospective buyers. The controller makes purchase offers available globally to potential sellers. Potential sellers then have the option to accept a purchase offer and thus bind the corresponding buyer to a contract. The method and apparatus of the present invention have applications on the Internet as well as conventional communications systems such as voice telephony.

44 Claims, 20 Drawing Sheets

OTHER PUBLICATIONS

Fran Golden, "AAL's Riga Doubts Marketel's Appeal to Retailers," *Travel Weekly*, Nov. 13, 1989.

Robert Kuttner, "Computers May Turn the World into One Big Commodities Pit," *Business Week*, Sep. 11, 1989.

"Web Ventures Presents BookIt!" press release printed from http://www.webventures.com/bookit/ (Web Ventures World Wide Web site) on Dec. 2, 1996.

METHOD AND APPARATUS FOR A CRYPTOGRAPHICALLY ASSISTED COMMERCIAL NETWORK SYSTEM DESIGNED TO FACILITATE BUYER-DRIVEN CONDITIONAL PURCHASE OFFERS

BACKGROUND OF THE INVENTION

1. Field of the Invention

The method and apparatus of the present invention relate to electronic contract applications using electronic networks.

2. Background

There are dozens of different buyer-seller protocols in use today. However, almost all of those systems are seller-driven in the sense that they focus on the methods and processes available to the seller, allowing him to price, package or configure goods and services more effectively. Stores, catalogs, classified advertisements, telemarketing, auction houses, even on-line computerized reservation systems such as SABRE, are all seller-driven. Traditionally, it is the seller's job to attract buyers and then to complete the sale. Thus, in a seller-driven system, the advertising cost of the transaction and the attendant risks that such advertising will be unsuccessful falls upon the seller.

Most goods and services sold at retail are done so using a general seller-driven protocol whereby the seller sets a price and the buyer decides whether or not to accept that price. Prices for some services, such as airline tickets, might change frequently, but the buyer must still wait for the seller to offer a price he finds acceptable. Obviously, some forms of commerce offer far more give and take with offers and counteroffers being exchanged, however the vast majority of retail purchases utilize seller-driven, fixed-price, non-negotiable pricing protocols.

Auctions are probably the most frequently used system whereby prices are not fixed by the seller. Here too, the system is seller-driven. The buyer does not find the seller, rather the seller attracts numerous buyers who, as a group, determine the final selling price—which the seller may subsequently reject unless the item auctioned is being sold without a reserve.

Even on-line reservation systems are seller-driven. Airline reservation systems such as SABRE are in the business of constantly posting airfares. Travel agents and consumers are on the bid side of the process. However, since they cannot communicate their bids to the airlines, they must wait until an "asked" fare is quoted which meets their needs.

Other commerce systems are exchange-driven. These systems, such as NASDAQ or the New York Stock Exchange (NYSE) match buyers and sellers by offering an efficient, fair and orderly marketplace. They favor neither buyers nor sellers, but simply effectuate communications that allow for the matching process to take place. An example of an automated exchange-driven commerce system for trading futures is disclosed in U.S. Pat. No. 4,903,201.

A buyer-driven system is one in which buyers find sellers, such as a "wanted to buy" classified ad. A help wanted ad is a buyer-driven inquiry since the employer is looking to locate and buy the services of a qualified employee. The inquiry is advertised to a large number of potential "sellers," a number of which may respond by submitting their resumes to the prospective employer.

Buyer-driven systems yield certain benefits and efficiencies that other commerce systems do not. Buyers using such a system can exercise more control over the terms and conditions of their purchases. Additionally, when a large number of potential sellers exist, but those sellers do not have the resources to advertise globally, it makes sense for buyers, if they can, to take the initiative in communicating its needs to the sellers.

Currently, there exist certain unilateral buyer-driven systems of commerce. A good example of such a system is the typical reward system wherein a "buyer" broadcasts/publishes an offer for a reward to anyone who completes a particular task. That type of system is unilateral because the offer can only be accepted by performance of the designated task. Thus, unilateral systems can be utilized only for limited types of transactions which allow for acceptance by performance.

Bilateral buyer-driven systems seek to consummate contracts between buyers and sellers based on mutual promises to perform. Bilateral buyer-driven systems, however, currently represent an extremely small portion of overall commerce due to a variety of factors. First, and perhaps foremost, buyers generally either cannot or do not want to invest the time, money or other resources required to locate an indefinite number of potential sellers and communicate the buyer's purchasing needs to each of the potential sellers. This is especially true of the individual consumer who often cannot afford to pay substantial transaction costs.

For example, an individual seeking car repair services generally would not want to contact every single repair shop and communicate details of his repair needs to each. The benefits to the consumer from doing so (e.g., achieving a lower price) would be vastly outweighed by the amount of time and money expended in the effort.

Also, buyer-driven systems are not prevalent because buyers do not want to be inundated with numerous offers from potential sellers, many of whom may be marginal or unqualified (e.g. a thousand real estate brokers or car dealers all calling one buyer). Buyer-driven systems impose inherent costs on sellers as well. If each buyer has a different set of purchasing specifications and communicates his needs using non-uniform language, sellers must pay a substantial cost even to review and understand each individual request. Moreover, sellers are often not amenable to customizing their products for individual buyers.

As a rule, the greater the number and complexity of the buyer's purchase conditions, the more difficult it is to have a buyer-driven market, since advertising costs generally rise with the number of conditions that must be communicated, and the potential number of sellers who can understand and fulfill increasingly complex conditions usually declines. Buyer-driven markets function best when there is a well-defined purchase need, when a "brand" provides quality assurance to the buyer such as the name of a major airline carrier or when the item is a commodity such as oil or coal.

An example of a regularly used bilateral buyer-driven process is the system utilized by large organizations such as companies or governments which want to purchase significant amounts of goods or services at the lowest possible price. To begin, they formulate a detailed written specification setting forth the quantities and requirements of what they are looking to buy. This document is typically called a "Request for Proposal" (RFP). Once finalized, RFPs are then distributed to a list of known potential suppliers. If the value of the RFP is high enough, as it is might be with a large government contract, the buyer may bear the added expense of trying to attract the widest number of sellers by paying to publish the RFP in newspapers and trade magazines.

Potential suppliers which identify an RFP that they might be able to fulfill, will first evaluate it to decide whether or not to invest the necessary time and effort to submit a formal proposal. Typically, some number of suppliers submit binding proposals to the buyer by a deadline established in the RFP. Once submitted, proposals are then evaluated by the buyer. One proposal is usually selected and the corresponding supplier notified that it has "won" the business at the price quoted.

Large organizations can take advantage of the benefits afforded by the RFP process because their volume buying represents a worthwhile opportunity for suppliers to compete for their business. They also have the resources to communicate their buying needs to a sufficient number of suppliers. As a result, they can often achieve substantial unit cost savings, especially on commodities or commodity services (such as paper clips or long distance service) and on perishable items (such as airline tickets and hotel rooms).

Individual consumers cannot effectively participate in such bilateral buyer-driven systems because they generally do not have the buying power and resources of large organizations. Some consumers have found ways to group together in order to achieve some measure of the volume buying power enjoyed by large organizations. Many consumers, however, are deterred from joining buying groups because of the groups' various requirements and limitations.

As commerce seeks to utilize the inherent advantages of the Internet, many types of commerce systems, such as malls, catalogs and auction house, are being implemented on the Internet. These approaches generally seek to create better seller or exchange-driven systems whereby the sale of goods and services is made more efficient.

While there have been some attempts to use the Internet to effectuate bilateral buyer-driven transactions, those attempts have been largely unsuccessful. Currently, there are "bulletin board" type sites on the Internet where buyers can post "wanted" advertising at little or no cost. Thus, any consumer could post his own RFP looking for companies willing to sell him the exact airline tickets they are looking to buy or a particular car with specified options included. Because Internet postings are global, the buyer theoretically has the ability to communicate his RFP to a large number of potential sellers. In practice, however, this process is ineffective as a buyer-driven system of commerce because potential sellers generally do not frequent the various "bulletin board" sites or respond to the individual RFPs.

Sellers are deterred from using such a process because there is no guarantee of the authenticity of the RFP, the cost of negotiating with individual consumers is often too high, and it is difficult to enforce any agreement (including payment guarantees) which may be reached between the consumer and the seller. Additionally, "bulletin boards" containing RFPs are scattered across the Internet making it difficult, if not impossible, for sellers to find relevant RFPs. Finally, when analyzing the RFPs that are posted on the Internet, sellers are confronted by an almost overwhelming number of different formats, conditions, terms, and language styles in the RFPs. Sellers must spend a large amount of time and money even simply to understand the prospective buyer's needs and the legal ramifications of the particular language used in each RFP. In sum, buyer RFPs posted on the Internet represent too much uncertainty for sellers. Sellers are not willing to spend the time and money finding and pursuing Internet RFPs. In turn, the absence of a critical mass of sellers reduces the incentive for buyers to post their RFPs.

Accordingly, there is a need for a centralized buyer-driven system of bilateral electronic commerce capable of being utilized by even small consumers to communicate their purchasing needs globally to potential sellers which addresses the deficiencies of the prior art. The advantages of such a system are manifold. It is the only way for a buyer efficiently to reach a large market of potential sellers. It also allows the buyer to set the terms he is willing to accept. As an additional advantage, it gives the sellers an indication of the state of the market for their product. Finally, since this technology is electronically based, costs are kept to a minimum.

A key element necessary to achieve a critical mass of seller participation in such a bilateral electronic buyer-driven system is the seller's ability to bind a buyer to a legal contract under the terms of the buyer's posted offer. In contrast to a non-binding request for proposal, a binding offer from a buyer is attractive to potential sellers because it sets out each and every term and condition under which the buyer will allow himself to be bound. Potential sellers do not need to worry about the costs of negotiating terms of sale with the individual buyer because the buyer has laid out all such terms in his offer. Additionally, allowing a seller to bind the buyer on the front end of the transaction will alleviate some seller concerns regarding enforcement because the seller has the opportunity to bind the buyer to a legally enforceable contract.

In order to understand the requirements necessary to form binding contracts through electronic commerce, a review of the current state of contract law is necessary.

Basic Contract Law

The formation of a legally binding contract requires three elements: offer, acceptance, and consideration. Put another way, an essential prerequisite to the formation of a contract is an agreement: a mutual manifestation of assent to the same terms. This mutual assent is established by a process of offer and acceptance. Further legal requirements are imposed by the Statute of Frauds, where applicable.

An offer has been defined as a manifestation of intent to act or refrain from acting in a specified way, so made as to justify a promise in understanding that a commitment has been made. A number of kinds of expressions border on, but are not, promises. The most important of these in the context of electronic commerce is a solicitation of an offer. For example, a clothing store advertisement of Brand X suit for $150 "today only" does not constitute an offer. The advertisement is merely an invitation to make an offer. Since the store has not specified a quantity nor included any language of commitment, an advertisement of this kind is only a statement of intention to sell or a preliminary proposal inviting offers. Similarly, the RFPs discussed above are merely solicitations of offers rather than bindable offers.

An offer may be accepted by any person in whom the power of acceptance is created. Because the offeror is the master of his offer, he controls the person or persons in whom a power of acceptance may be created. The identity of the offerees is determined by the reasonable person test. Thus, for example, it has been determined that a reward offer may ordinarily be accepted by anyone who knows of the offer, but once the offer has been accepted, no one else may accept. On the other hand, an offer to pay a sum of money to anyone who is willing to sell an 1869 Morgan Silver Dollar in M69 condition may be accepted by anyone who knows of the offer and by any number of persons. Essentially, the language of the offer determines to whom it is offered and who may accept it. Thus, by wording an offer appropriately, it can be directed to a number of persons but capable of acceptance by only one.

Under the doctrine of consideration, the third of the three basic elements of contract formation, gratuitous promises are not enforced. This doctrine does not pose any difficulties in the context of electronic commerce.

In order judicially to enforce a contract, the Statute of Frauds requires that a party produce a written copy of it. However, the rule is only invoked if the contract is of a certain type, such as a contract for the sale of real property. The primary purpose of this rule is to obviate perjury. The result is that oral contracts are often unenforceable. However, because this often leads to unjust results, courts are construing it narrowly and policy makers are lobbying for its repeal.

Electronic Contracting Law and the Current State of the Art

With the advent of new technology, methods of doing business are rapidly expanding. These new methods challenge traditional contract principles, which are premised on personal contact and paper contracts. Thus, some legal issues in the field of electronic commerce remain unresolved.

One such technology is known as EDI, or electronic data interchange. It is known that, using EDI, one party can transfer information and legally relevant "documents" electronically to another for direct processing in the other party's information systems.

Most EDI environments involve ongoing relationships between companies engaged in a supply or similar contract that extends over time. In current practice, many EDI exchanges occur under broader contracts regulating the terms of the relationship between the two parties. These may be in the nature of requirements or franchise contracts. As applied directly to the EDI aspects of the relationship, the agreements are typically described as "trading partner" agreements. These agreements deal with under what terms, conditions, and limitations the EDI system will be employed to make or accept orders and, ideally, to define the legal consequences of the electronic exchanges between the parties to the trading agreement. Although this technology may also be used for isolated or intermittent transactions between people who have no direct prior dealings, it has not been used for global/non-personal buyer-driven offers.

EDI has not yet been the subject of much "lawmaking." The evolution of EDI law has been primarily in commercial experimentation and model trading partner contract development, seeking an optimal contract structure for EDI use. Little reported litigation deals with EDI relationships. Thus, the legal issues raised by this technology are largely unresolved.

Despite the uncertainty, when an exchange occurs in a purely electronic environment, the threshold legal determination revolves around whether the electronic messages establishes an offer and acceptance given the absence of documentation and in the case of EDI, the absence of human decisions in the automated exchange.

The exchange of electronic messages that offer and accept a contractual relationship should form a contract with respect to the specific order. An offer consists of an expression of a willingness to enter a contract when that expression occurs in a form sufficiently concrete to establish that agreement. Under this doctrine, an electronic message may constitute the necessary expression of intent. Problems exist where unauthorized people or inaccurate information trigger an offer from a system. These problems could be solved by methods of attribution or authentication. Once questions of attribution are resolved, and subject to considerations about the Statute of Frauds and the like, no requirement exists in law that a contract offer be in writing or that there be a conscious, immediate intent to make a binding commitment.

Contract rules provide that acceptance must be made in the manner specifically required by the offeror. However, if no specification of the method for acceptance is made in the originating offer, acceptance may be in any manner and by any medium reasonable under the circumstances. Thus, acceptance by electronic message should be valid.

A further consideration in electronic commerce is the Statute of Frauds. In transactions involving a sale of goods for the price of $500 or more, U.C.C. Section 2-201 requires: (1) a writing; (2) containing a quantity term; (3) sufficient to indicate that a contract has been made; (4) signed by the party against whom enforcement is sought. In the EDI context, this presents problems in reference to the existence of a "writing" and in the requirement of a "signature" by the party against whom enforcement is sought. U.C.C. Section 1-201(46) defines "writing" to include "printing, typewriting or any other intentional reduction to tangible form." The critical aspect of this definition deals with the reduction of the agreement to tangible form. The purpose of requiring a writing to enforce a contract is to ensure some minimum level of proof of intent and avoid the risk of an entirely conjectural debate regarding the existence or scope of the agreement. The sufficiency of an electronic message as a "writing" under the Statute of Frauds depends on the manner in which one finds the message stored or produced. Case law generally supports the idea that a telex or telegram satisfies the writing requirement, although it may leave unanswered whether the writing contains a proper signature.

Of course, the writing requirement can be satisfied by other means. For example, if the electronic agreement is followed up by a letter or if the system routinely yields printed output, the requirement should be satisfied. But apart from a printed output at the receiving point or in a functional acknowledgment returned after receipt, the enforceability of a purely electronic contract depends on how the computer system retains records of the transmitted offer (or acceptance) and whether a court will accept the idea that electronic records reduce the message to tangible form.

The Statute of Frauds' signature requirement also leaves ambiguity about the legality of EDI-generated contracts. U.C.C. Section 1-201 (39) defines "signed" as including any "symbol executed or adopted by a party with present intention to authenticate a writing." Authentication here indicates that the signer assents to the writing and adopts it as his own. As a result, an arrangement in which the transmitting party includes otherwise not routine or required elements, codes or other indicia to confirm the authenticity of the message should satisfy the signature requirement. Ordinary EDI practice often requires such authentication code or symbol as a matter of course to maintain the security of the system itself, and this also seems to satisfy the Statute of Frauds problem.

Indeed, authentication systems have been developed specifically to ensure the enforceability of electronic contracts. One such method of authenticating electronic contracts in order to make them legally enforceable is disclosed in U.S. Pat. No. 5,191,613. That system utilizes, among other techniques, digital signatures to authenticate electronic contracts.

As discussed above, attribution via authentication is extremely important to creating binding contracts in a buyer-driven system of electronic commerce involving global posting of purchase offers—it is essential to the signature requirement of the Statute of Frauds. Authentication may become even more important in the future, if proposed U.C.C. revisions are implemented. For example. Proposed U.C.C. Section 2-212 states that an electronically formed contract is legally binding if the message is authenticated by a procedure previously agreed to by the parties.

Moreover, a bilateral buyer-driven system of commerce which authenticates the terms and conditions of buyer offers will be more likely to attract the attention of potential sellers, because they are assured of the legitimacy of the offer.

There is also a need for a third party to administer such a bilateral buyer-driven system. The third party can serve as a trusted arbitrator available to resolve contract disputes between the parties and thereby increase buyer and seller confidence in the system. Additionally, the third party can establish standard protocols, formats, terms and language to be used in buyer offers and thus make it easier for sellers to understand and assess individual offers. Finally, the third party can administer a site on the Internet where buyers can post their purchase offers and sellers can go to review the posted offers. Having all offers in a centralized location makes it easier for sellers to search for relevant purchase offers.

The applicant is unaware of the existence of any commercially-viable bilateral buyer-driven commerce system which contains the above features and addresses the above-described shortcomings in the prior art. Therefore, it is one object of the present invention to set forth a system of bilateral buyer-driven electronic commerce that offers the capability for individual buyers to issue authenticatable messages which contain the terms of a purchase offer and publish that purchase offer globally to potential sellers.

Another object of the present invention is to allow a seller who meets the terms of the purchase offer to bind the buyer to accept the seller's fulfillment of that offer.

Yet another object of the present invention is to allow the seller to be able to collect funds immediately upon his acceptance of the buyer's terms as set forth in the purchase offer.

It is a further object of the present invention to allow for a trusted third-party administrator whose decision regarding the fulfillment, adequacy or interpretation of any aspect of the process shall be binding on the parties.

It is another object of the present invention to allow the seller to receive part of his payment upon agreeing to the buyer's purchase offer, and a subsequent payment upon delivery of the goods or services called for in the buyer's purchase offer.

It is yet another object of the present invention to allow either buyers or sellers to remain anonymous up until such time as an agreement is consummated and for buyers to remain anonymous even after the agreement is consummated by using the trusted third-party as a relay system for delivery of goods or services called for by the buyer's purchase offer.

A further object of the present invention is to ensure that buyers using the inventive system are not inundated with inquiries or acceptances from unqualified sellers.

Yet a further object of the invention is to provide a system in which the identity of the buyer is authenticated along with the integrity of the buyer's purchase offer.

Another object of the invention is to provide a system in which the identity of the seller is authenticated in order to determine the seller's capacity to satisfy the conditions of the purchase offer.

It is another object of the present invention to allow sellers to submit authenticatable counteroffers to the buyer.

Yet another object of the present invention is that such counteroffers may allow the buyer to bind the seller to the counteroffer, subject to the authenticatable terms of that counteroffer.

It is a further object of the present invention to allow for delivery of digitally-based products such as certificates of insurance from the seller to the buyer according to the terms of the buyer's purchase offer and the cryptographic validation of such delivery.

It is another object of the present invention to allow for purchase offers where more than one seller may bind the buyer to the purchase offer.

Another object of the present invention is to show how all or part of the system can be practiced using non-electronic means such as printed media or advertisements in newspapers.

These and other objects of the invention will be apparent to those skilled in the art from the following detailed description of the invention, the accompanying drawings and the appended claims.

SUMMARY OF THE INVENTION

In a preferred embodiment, the present invention provides a method and apparatus for prospective buyers of goods or services to communicate a binding purchase offer globally to potential sellers, for sellers conveniently to search for relevant buyer purchase offers, and for sellers to bind a buyer to a contract based on the buyer's purchase offer. Additionally, the present invention can effectuate performance of the agreement between the buyer and seller by guaranteeing buyer payment for the purchase. The present invention is therefore a highly effective bilateral buyer-driven commerce system which improves the ability of buyers to reach sellers capable of satisfying the buyers' purchasing needs and improves sellers' ability to identify interested buyers.

In one embodiment of this invention, communications between buyers and sellers are conducted using an electronic network and central controller. A buyer who wishes to make a purchase accesses the central controller located at a remote server. The buyer will then create a conditional purchase offer ("CPO") by specifying the subject of the goods he wishes to purchase, a description of the goods he wishes to obtain, and any other conditions the buyer requires. For example, a typical CPO could specify that the buyer wants to purchase a block of four airline tickets from Chicago's O'Hare Airport to Dallas, Tex., the tickets must be from any of the six largest U.S. carriers, the buyer is willing to change planes no more than once so long as the scheduled layover is less than two hours, and the buyer is willing to pay $180 per ticket, plus any applicable taxes.

The buyer then attaches a user identification to the CPO and transmits the CPO to the central controller. Under the present invention, the CPO may be transmitted via numerous means including a world-wide-web interface, electronic mail, voice mail, facsimile, or postal mail. Standard legal provisions and language are then integrated with the CPO to "fill in the gaps" of the buyer's purchase offer. Alternatively, the CPO may be developed while the buyer is on-line with the central controller.

Before communicating the CPO to potential sellers, the central controller authenticates the buyer's identification number against a buyer database. The central controller may require that the buyer provide a credit card number and may also ensure that the buyer has sufficient credit available to cover the purchase price specified in the CPO by contacting the credit card clearinghouse. The central controller then assigns a unique tracking number to the CPO and globally displays the CPO in a manner such that it is available to be viewed by any interested potential sellers. CPOs may be displayed by subject category to make it easier for potential sellers to identify relevant CPOs. Thus, a seller could log onto a website, for example, and see a listing of CPO subject categories. The seller could then choose a particular subject and have the ability to browse CPOs which correspond to that subject category. In one embodiment, the seller may be required to provide qualifications in order to view the CPOs of a given subject category.

If, after reviewing a particular CPO, a potential seller wishes to accept the CPO, the seller communicates his intent to the central controller. The central controller then timestamps the message from the seller and authenticates the identity of the seller and his capacity to deliver the goods sought by the buyer. The system then verifies that the particular CPO is still "active" and capable of being accepted. If a CPO is capable of being accepted only by one seller, it is "completed" when the first qualified seller accepts it. Subsequent sellers will not be able to accept a "completed" CPO. If a seller accepts an active CPO, a unique tracking number is assigned to the seller's acceptance. The acceptance is then stored in a database. The buyer and seller are now parties to a legally binding contract.

In another embodiment, the central controller manages the payment system between the buyer and seller automatically. Various methods of payment may be utilized by the invention, including credit cards, personal checks, electronic funds transfer, debit cards, and digital cash. The payment system may also involve the use of an escrow account associated with the buyer wherein funds advanced by the buyer to cover the purchase of a desired good can be kept pending acceptance by a qualified seller. Moreover, the timing of payment to the seller can be varied. The seller can be paid immediately after the seller accepts the CPO or payment can be delayed until after the seller performs his obligations under the contract.

In yet another embodiment of the present invention, a seller is given the option to respond to a CPO by issuing a binding counteroffer with conditions different from the original CPO. The seller transmits the counteroffer to the central controller which then forwards the counteroffer to the buyer. The buyer is then given the option of accepting the counteroffer and thereby binding the seller to a contract.

The present invention can also be practiced in off-line embodiments. Instead of using electronic mail or web-based servers, buyers and sellers may communicate with the central controller via telephone, facsimile, postal mail, or another off-line communication tool. For example, buyers may use telephones to create CPOs (with or without the assistance of live agents) and potential sellers may use a telephone to browse and bind CPOs.

In another on-line embodiment, cryptographic protocols are used to authenticate the identity of buyers and/or sellers and verify the integrity of buyer and seller communications with the central controller. Using cryptography and biometrics, the central controller can make it significantly more difficult for unauthorized persons to tamper with the system by passing themselves off as legitimate buyers or sellers or eavesdropping on system communications.

Anonymity is another advantage of the present invention. For numerous privacy and competitive reasons, buyers and sellers often prefer not to have their identities revealed to the general public when engaging in commercial transactions. The present invention effectuates the anonymity of buyers and sellers through the use of identification numbers stored in a database secured by the central controller.

One embodiment of the present invention divides the functionality of the central controller into three components and embodies them in three separate servers: an operations server, a trusted server, and a bonding agency. The trusted server authenticates the identity of buyers and sellers while the bonding agency verifies their ability to pay or deliver goods. The operations server posts the CPO, relying upon messages from the other two servers for validation. This configuration allows for greater specialization of the servers.

Another embodiment of the present invention does not require a transfer of money from a buyer to a seller. Instead, the system may be used to consummate a contract involving an exchange of goods, services, or other non-monetary consideration.

Finally, an embodiment of the present invention includes a mechanism for resolving disputes between buyers and sellers arising out of agreements consummated using the system. The parties may be required in CPOs to stipulate to binding arbitration and may be assisted in the arbitration process by the central controller. The central controller may serve as an arbitrator or may refer the dispute to a third-party arbitrator for resolution.

What the present invention accomplishes, which no previous system has done before, is literally to hang buyer money on a "clothesline" for sellers to see. Attached to the money is a note describing what the seller has to agree to do in order to take the money down off the clothesline. There is no uncertainty or waste of time on the part of the seller. He knows that if he can meet the conditions set forth by the buyer, he can immediately close the sale and get paid for it. No hassles. No negotiations.

The invention also allows buyers to reach a large number of remotely located sellers who normally would not be able to afford to find the buyer, but who may be able to provide the buyer with the exact deal the buyer desires. For instance, this might be the case for a car buyer who could precisely define the car and option packages he wanted for a specified price. The present invention allows such a buyer to issue a binding purchase offer which is globally communicated to authorized dealers in the U.S.. Any one of those dealers could then decide whether or not to accept the offer. The buyer's advantage is particularly significant when the sellers of products sought by the buyer have no inventory carrying costs, as is the case with insurance sales. Insurance buyers could use the present invention to cast a wide net to reach thousands of potential insurance sellers and potentially find a seller willing to satisfy the buyer's specified purchase conditions.

It is a goal of the present invention to provide a robust system which matches buyers' requirements with sellers capable of satisfying those requirements. The invention provides a global bilateral buyer-driven system for creating binding contracts incorporating various methods of communication, commerce and security for the buyer and the seller. The power of a central controller to field binding offers from buyers, communicate those offers globally in a format which can be efficiently accessed and analyzed by potential sellers, effectuate performance of resulting contracts, resolve disputes arising from those contracts, and maintain billing, collection, authentication, and anonymity makes the present invention an improvement over conventional systems.

DETAILED DESCRIPTION OF THE INVENTION

The method and apparatus of the present invention will now be discussed with reference to FIGS. 1, 2, 3, and 4. In a preferred embodiment, the present invention includes central controller 200, seller interface 300, buyer interface 400, and associated databases. The present invention receives conditional purchase offers from buyers, makes them available for viewing by potential sellers, and allows sellers to bind them. Thus, a buyer is able to communicate his commitment to follow through on an offer to a seller, giving the seller confidence that if he can produce the goods, the buyer has the ready capacity to pay.

System Architecture

Figure 1:
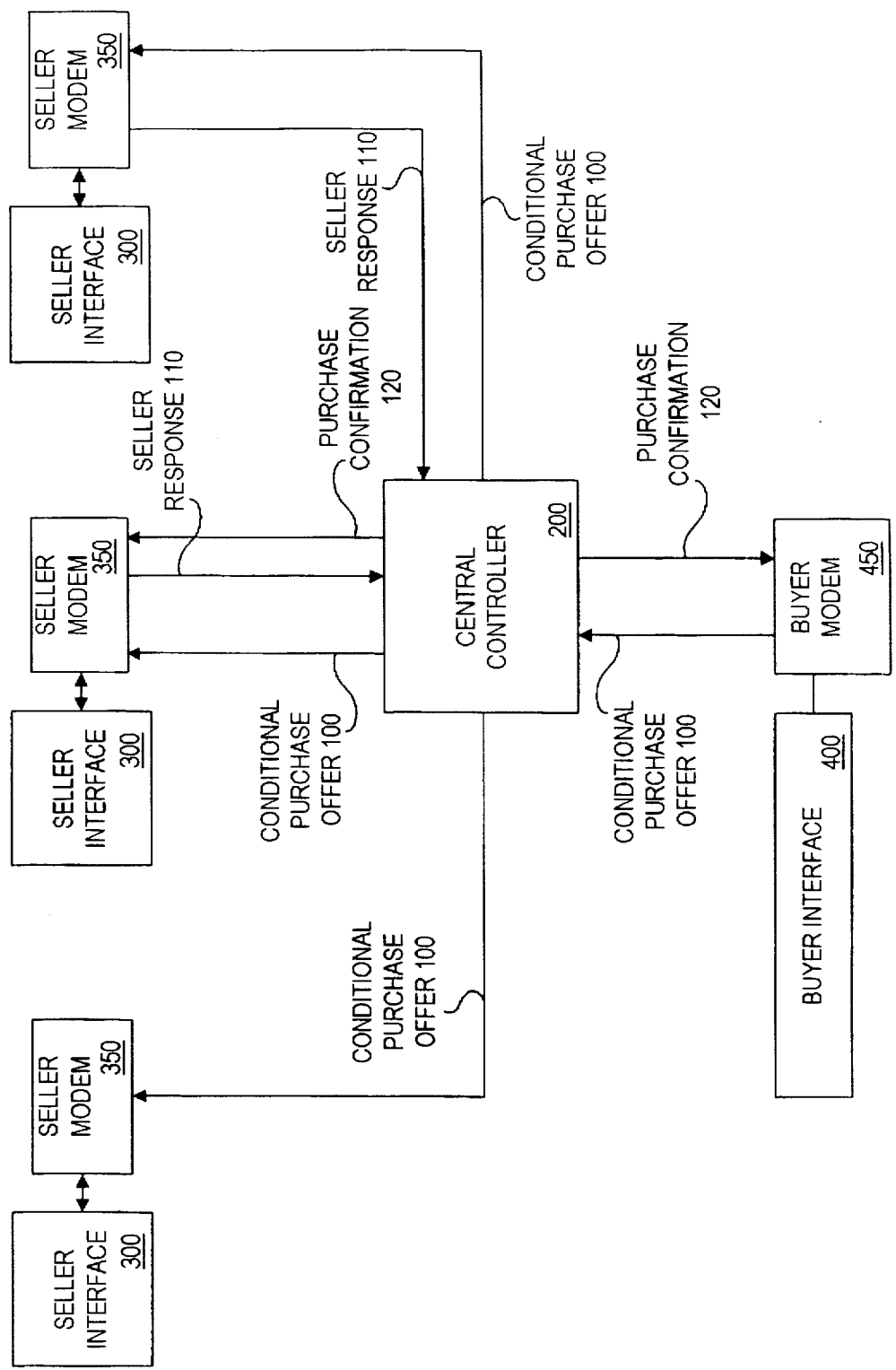
FIG. 1 illustrates a first embodiment of the present invention.

The system architecture of a first embodiment of the apparatus and method of the present invention is illustrated with reference to FIGS. 1 through 4. As shown in FIG. 1, the apparatus of the present invention comprises seller interface 300, central controller 200, and buyer interface 400 (collectively the "nodes"). Each node is connected via an Internet connection using a public switched phone network, such as those provided by a local or regional telephone operating company. Connection may also be provided by dedicated data lines, cellular, Personal Communication Systems ("PCS"), microwave, or satellite networks. Seller interface 300 and buyer interface 400 are the input and output gateways for communications with central controller 200.

Using the above components, the present invention provides a method and apparatus to post conditional purchase offers, make them available to potential sellers, and allow sellers to bind the offers to form a legally binding contract.

Figure 2:
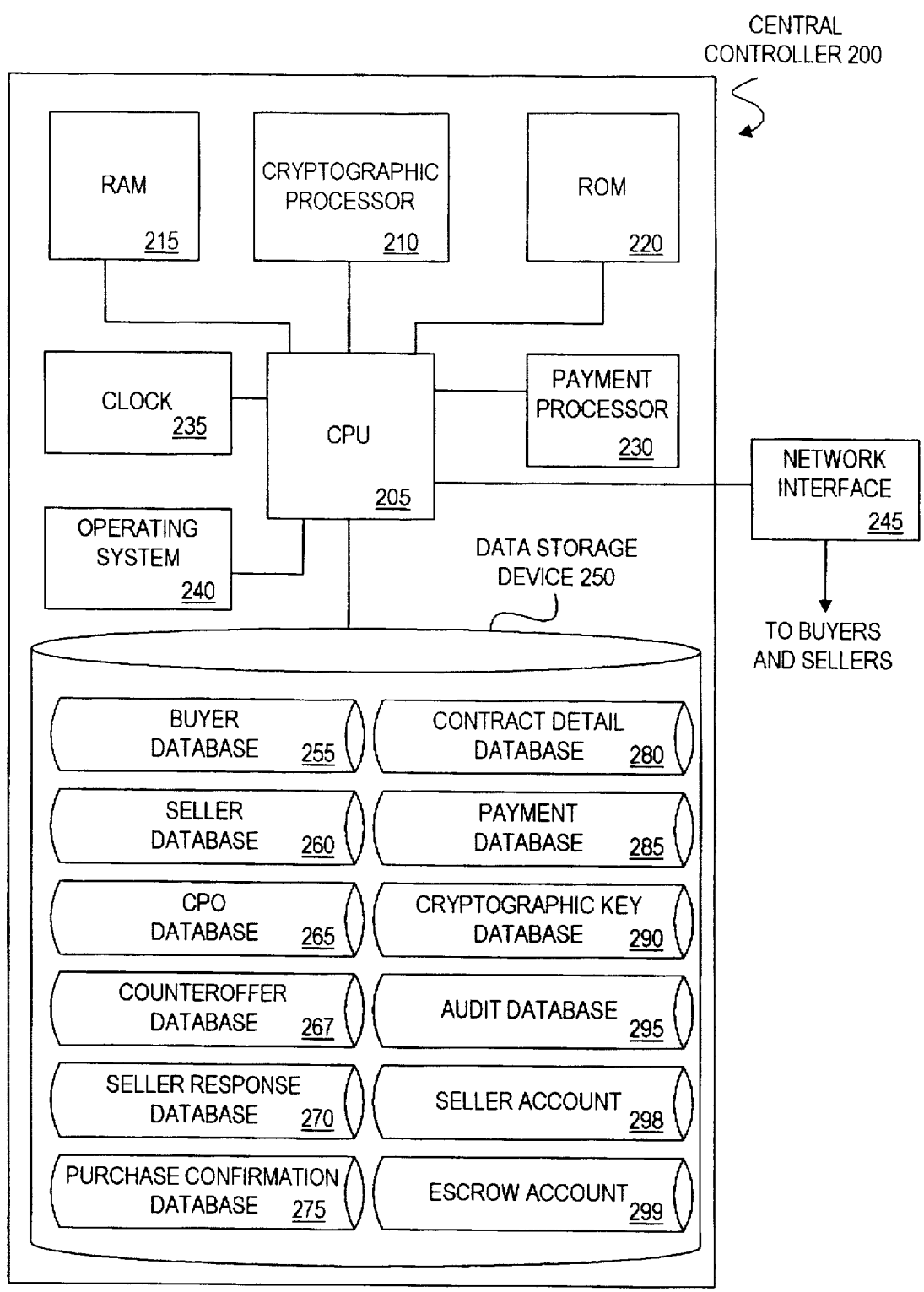
FIG. 2 is a block diagram showing one embodiment of the central controller.

As shown in FIG. 2, central controller 200 includes central processor (CPU) 205, cryptographic processor 210, RAM 215, ROM 220, payment processor 230, clock 235, operating system 240, network interface 245, and data storage device 250.

A conventional personal computer or computer workstation with sufficient memory and processing capability may be used as central controller 200. In one embodiment it operates as a web server, both receiving and transmitting CPOs 100 generated by buyers. Central controller 200 must be capable of high volume transaction processing, performing a significant number of mathematical calculations in processing communications and database searches. A Pentium microprocessor such as the 100 MHz P54C, commonly manufactured by Intel Inc., may be used for CPU 205. This processor employs a 32-bit architecture. Equivalent processors include the Motorola 120 MHz PowerPC 604 or Sun Microsystems 166 MHz UltraSPARC-I.

An MC68HC16 microcontroller, commonly manufactured by Motorola Inc., may be used for cryptographic processor 210. Equivalent processors may also be used. This microcontroller utilizes a 16-bit multiply-and-accumulate instruction in the 16 MHz configuration and requires less than one second to perform a 512-bit RSA private key operation. Cryptographic processor 210 supports the authentication of communications from both buyers and sellers, as well as allowing for anonymous transactions. Cryptographic processor 210 may also be configured as part of CPU 205. Other commercially available specialized cryptographic processors include VLSI Technology's 33 MHz 6868 or Semaphore Communications' 40 MHz Roadrunner284.

Referring again to FIG. 2, payment processor 230 comprises one or more conventional microprocessors (such as the Intel Pentium), supporting the transfer and exchange of payments, charges, or debits, attendant to the method of the apparatus. Payment processor 230 may also be configured as part of CPU 205. Processing of credit card transactions by payment processor 230 may be supported with commercially available software, such as the Secure Webserver manufactured by Open Market, Inc. This server software transmits credit card numbers electronically over the Internet to servers located at the Open Market headquarters where card verification and processing is handled. Their Integrated Commerce Service provides back-office services necessary to run Web-based businesses. Services include on-line account statements, order-taking and credit card payment authorization, credit card settlement, automated sales tax calculations, digital receipt generation, account-based purchase tracking, and payment aggregation for low-priced services.

Data storage device 250 may include hard disk magnetic or optical storage units, as well as CD-ROM drives or flash memory. Data storage device 250 contains databases used in the processing of transactions in the present invention, including buyer database 255, seller database 260, CPO database 265, counteroffer database 267, seller response database 270, purchase confirmation database 275, contract detail database 280, payment database 285, cryptographic key database 290, and audit database 295. In a preferred embodiment database software such as Oracle7, manufactured by Oracle Corporation, is used to create and manage these databases. Data storage device 250 also stores information pertaining to buyer account 297, seller account 298, and escrow account 299.

Buyer database 255 maintains data on buyers with fields such as name, address, credit card number, phone number, ID number, social security number, electronic mail address, credit history, past system usage, public/private key information, etc. This information is obtained when the buyer first registers with the system, or immediately prior to posting his first CPO 100. Buyer database 255 also contains the tracking number of each CPO 100 generated by the buyer, and the tracking number of each seller response 110 and counteroffer 140 directed to the buyer's CPOs 100.

Seller database 260 maintains data on sellers with fields such as name, contact information, public/private key information, payment preferences, type of business, and goods sold. Contact information comprises a phone number, web page URL, bulletin board address, pager number, telephone number, electronic mail address, voice mail address, facsimile number, or any other way to contact the seller. Upon registration, the seller may be required to demonstrate evidence of ability to deliver on bound CPOs 100. An airline, for example, might submit a listing of the city pairs they service so that central controller 200 can quickly determine whether the airline is capable of satisfying a given CPO 100.

CPO database 265 tracks all CPOs 100 with fields such as status, tracking number, date, time, subject, price, expiration date, conditions, and buyer identification number. This database is valuable in the event of disputes between buyers and sellers regarding payment, because details of the contract can be produced. CPO database 265 may also store bond certificate 172.

Counteroffer database 267 tracks all counteroffers 140. The structure of this database is identical to CPO database 265, except for the addition of a field for CPO tracking number which allows counteroffer 140 to be correlated with a particular CPO 100.

Seller response database 270 tracks all seller responses 110 with fields such as seller name, seller ID number, date, time, seller response tracking number, and associated CPO tracking number.

Purchase confirmation database 275 tracks the messages sent to the buyer and seller confirming completed transactions (bound contracts). Fields include buyer name, buyer ID number, seller name, seller ID number, purchase confirmation tracking number, and associated CPO tracking number.

Contract detail database 280 contains form background provisions for inclusion in CPOs 100. These form provisions effectively fill the gaps between conditions specified by the buyer, specifying the generic contract details common to most CPOs 100.

Payment database 285 tracks all payments made by the buyers with fields such as buyer name, buyer ID number, amount of payment, and associated CPO tracking number. This database may also store credit card numbers of buyers.

Cryptographic key database 290 facilitates cryptographic functions, storing both symmetric and asymmetric keys. These keys are used by cryptographic processor 210 for encrypting and decrypting CPOs 100, seller responses 110, purchase confirmations 120, counteroffers 140, and buyer responses 150.

Audit database 295 stores transactional information relating to the posting of CPOs 100, allowing it to be retrieved for later analysis.

Buyer account 297 tracks all information pertaining to the buyer's account with fields such as buyer's name, bank and credit account numbers, and debit or credit transactions. This account may be a pointer to account data stored at the buyer's bank.

Seller account 298 tracks all information pertaining to the seller's account with fields such as seller's name, bank and credit account numbers, and debit or credit transactions. Buyer payments for CPOs 100 may be sent to this account.

Escrow account 299 is an account which temporarily holds buyer funds before they are placed in seller account 298.

Network interface 245 is the gateway to communicate with buyers and sellers through respective buyer interface 400 and seller interface 300. Conventional internal or external modems may serve as network interface 245. Network interface 245 supports modems at a range of baud rates from 1200 upward, but may combine such inputs into a T1 or T3 line if more bandwidth is required. In a preferred embodiment, network interface 245 is connected with the Internet and/or any of the commercial on-line services such as America Online, CompuServe, or Prodigy, allowing buyers and sellers access from a wide range of on-line connections. Several commercial electronic mail servers include the above functionality. NCD Software manufactures "Post.Office," a secure server-based electronic mail software package designed to link people and information over enterprise networks and the Internet. The product is platform independent and utilizes open standards based on Internet protocols. Users can exchange messages with enclosures such as files, graphics, video and audio. The system also supports multiple languages. Alternatively, network interface 245 may be configured as a voice mail interface, web site, BBS, or electronic mail address.

While the above embodiment describes a single computer acting as central controller 200, those skilled in the art will realize that the functionality can be distributed over a plurality of computers. In one embodiment, central controller 200 is configured in a distributed architecture, wherein the databases and processors are housed in separate units or locations. Some controllers perform the primary processing functions and contain at a minimum RAM, ROM, and a general processor. Each of these controllers is attached to a WAN hub which serves as the primary communication link with the other controllers and interface devices. The WAN hub may have minimal processing capability itself, serving primarily as a communications router. Those skilled in the art will appreciate that an almost unlimited number of controllers may be supported. This arrangement yields a more dynamic and flexible system, less prone to catastrophic hardware failures affecting the entire system. The trusted server embodiment provides more details of such a distributed environment, describing operations server 160, trusted server 165, and bonding agency 170. The hardware of these servers would be configured similarly to that described for central controller 200.

Figure 3:
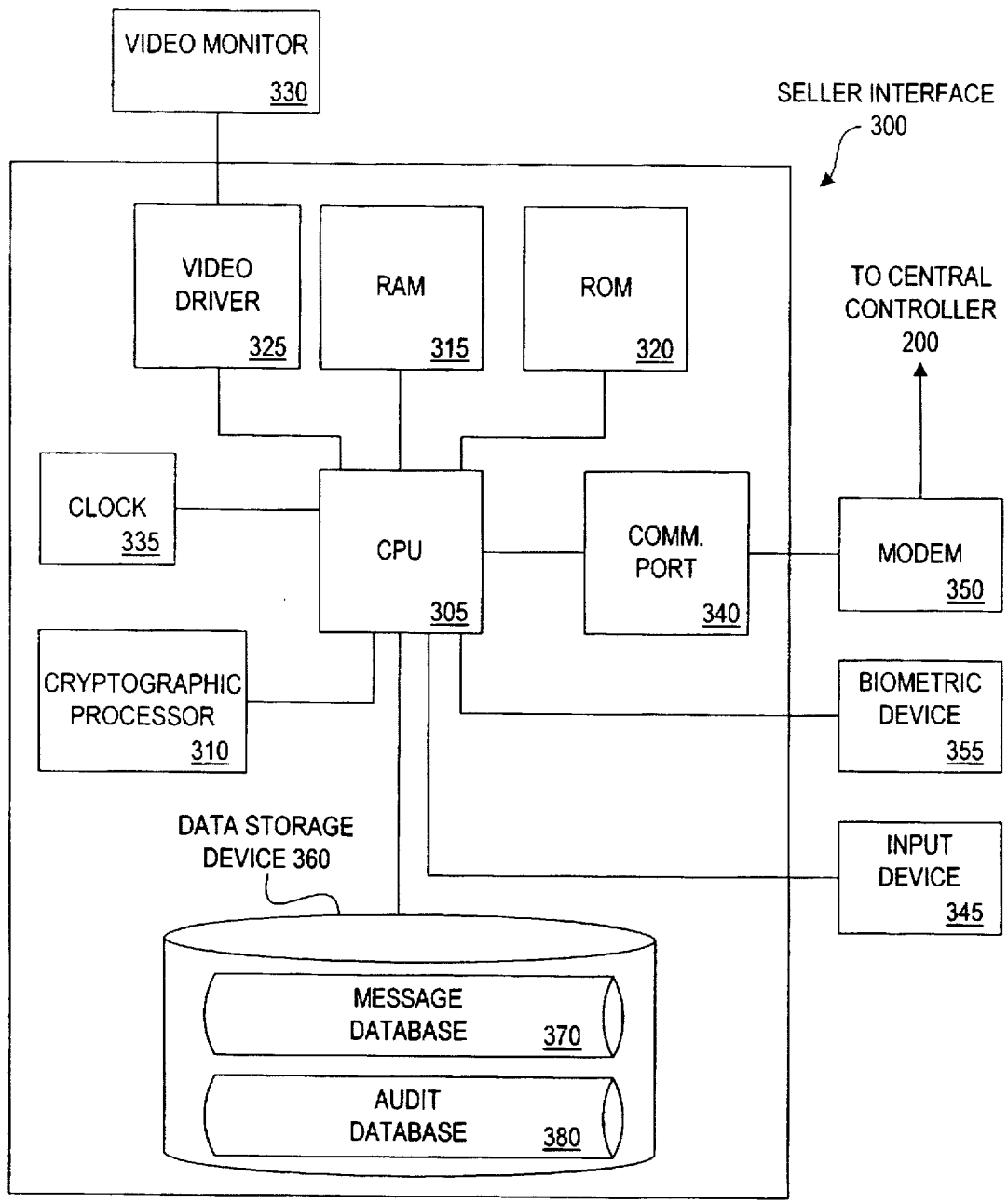
FIG. 3 is a block diagram showing one embodiment of the seller interface.
Figure 4:
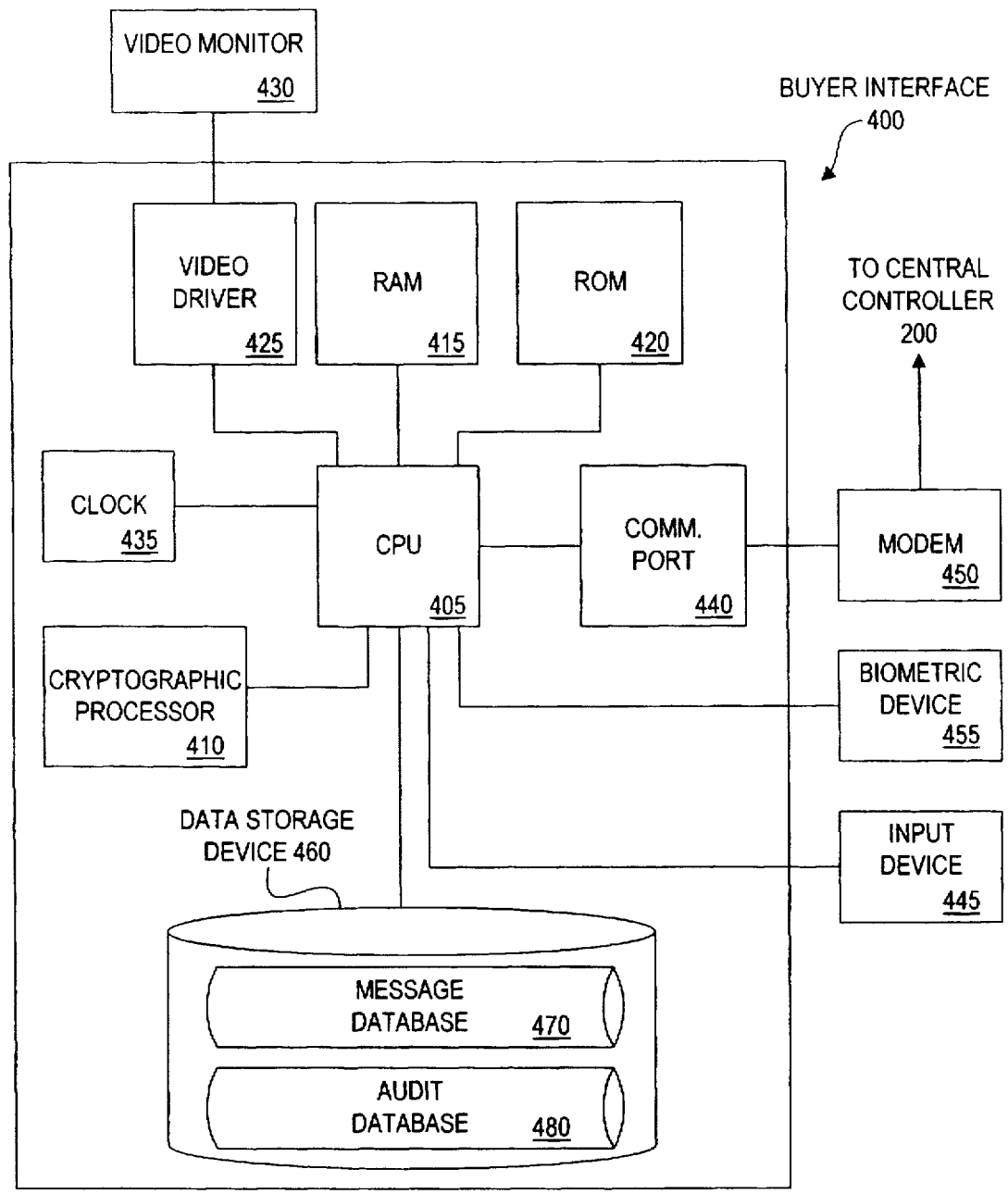
FIG. 4 is a block diagram showing one embodiment of the buyer interface.

FIGS. 3 and 4 describe seller interface 300 and buyer interface 400, respectively. In an exemplary embodiment they are both conventional personal computers having an input device, such as a keyboard, mouse, or conventional voice recognition software package; a display device, such as a video monitor; a processing device such as a CPU; and a network interface such as a modem. These devices interface with central controller 200. Alternatively, seller interface 300 and buyer interface 400 may also be voice mail systems, or other electronic or voice communications systems. As will be described further in the following embodiments, devices such as fax machines or pagers are also suitable interface devices.

Referring now to FIG. 3, there is described seller interface 300 which includes central processor (CPU) 305, RAM 315, ROM 320, clock 335, video driver 325, video monitor 330, communication port 340, input device 345, modem 350, and data storage device 360. Cryptographic processor 335 and biometric device 355 may be added for stronger authentication as described later. A Pentium microprocessor such as the 100 MHz P54C described above may be used for CPU 305. Clock 335 is a standard chip-based clock which can serve to timestamp seller response 110 or counteroffer 140 produced with seller interface 300.

Modem 350 may not require high-speed data transfer if most seller responses 110 and counteroffers 140 produced are text-based and not too long. If a cryptographic processor is required, the MC68HC16 microcontroller described above is used. The structure of biometric device 355 will be described below in conjunction with the cryptographic authentication embodiment.

Data storage device 360 is a conventional magnetic-based hard disk storage unit such as those manufactured by Conner Peripherals. Message database 370 may be used for archiving seller responses 110 and counteroffers 140, while audit database 380 may be used for recording payment records and communications with central controller 200.

Referring now to FIG. 4, there is described buyer interface 400 which includes central processor (CPU) 405, RAM 415, ROM 420, clock 435, video driver 425, video monitor 430, cryptographic processor 435, communication port 440, input device 445, modem 450, and data storage device 460. All of these components may be identical to those described in FIG. 3.

There are many commercial software applications that can enable the communications required by seller interface 300 or buyer interface 400, the primary functionality being message creation and transmission. Eudora Pro manufactured by Qualcomm Incorporated, for example, provides editing tools for the creation of messages as well as the communications tools to route the message to the appropriate electronic address. When central controller 200 is configured as a web server, conventional communications software such as the Netscape navigator web browser from Netscape Corporation may also be used. The buyer and seller may use the Netscape Navigator browser to transmit CPO 100, seller response 110 or counteroffers 140. No proprietary software is required.

Online Embodiment

In one embodiment of the present invention, communications between buyers and sellers take place via electronic networks, with central controller 200 acting as a web server. The buyer logs on to central controller 200, creates CPO 100, and then disconnects from the network. CPO 100 is made available to potential buyers by posting CPO 100 on the web page of central controller 200. Periodic maintenance is performed by central controller 200 to ensure that active CPOs 100 have not expired, and that the buyer has sufficient credit available to pay a seller who elects to bind CPO 100. Seller responses 110 are transmitted electronically to central controller 200 which contacts the buyer to indicate that CPO 100 has been bound. Central controller 200 transfers credit card information to the seller as soon as CPO 100 is bound.

Figure 5:
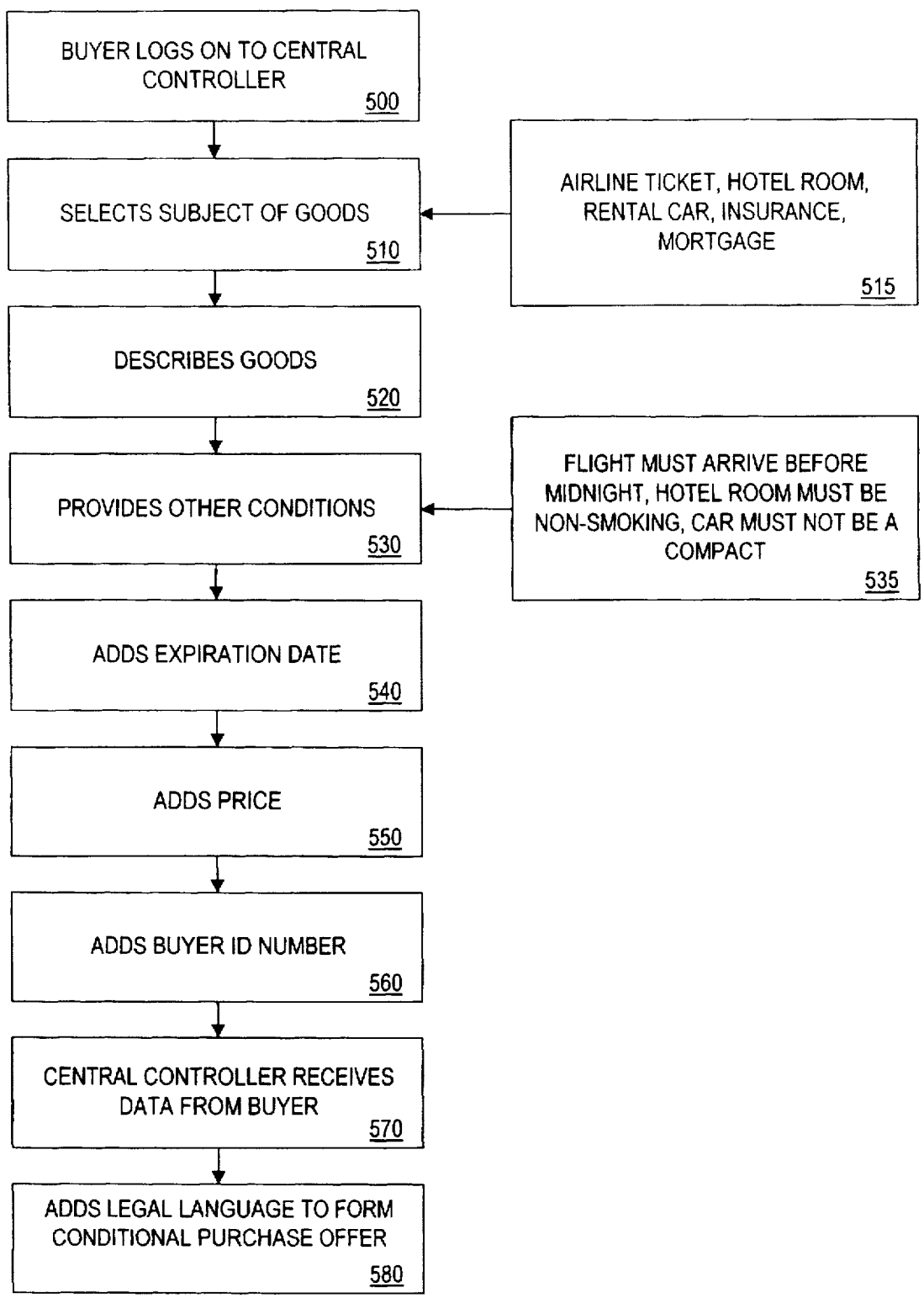
FIG. 5 illustrates an embodiment showing how a conditional purchase offer is generated.

With reference to FIG. 5, there is described the process by which the buyer formulates CPO 100. At step 500, the buyer logs on to central controller 200 using buyer modem 450 of buyer interface 400, establishing a communication link. It should be noted that the buyer may be an individual, a corporation, a partnership, a government, or any other entity. In one embodiment, central controller 200 has a page on the world wide web, allowing the buyer to provide information through the interface of conventional web browser software such as Netscape Navigator, manufactured by Netscape, Inc. At step 510, the buyer selects the subject of the goods he wants to purchase by selecting from a list of possible subjects. As shown in box 515, subjects might include airline tickets, hotel rooms, rental cars, insurance, mortgages, clothing, etc. After the subject is selected, a form is displayed on video monitor 430 of buyer interface 400. This form is an electronic contract with a number of blanks to be filled out by the buyer, with each blank representing a condition of CPO 100.

At step 520, the buyer enters a description of the goods. A business traveler, for example, might want to fly from San Francisco to New York. The description of the goods might be two first class round-trip tickets between those city pairs, leaving May 7 and returning May 12. There would be a place on the form for originating city, destination city, date of departure, date of return, number of tickets, class of service, etc. The buyer simply fills in the blanks. The buyer then adds other conditions at step 530. The buyer, for example, may only want a nonstop ticket on a flight arriving at the destination city before midnight. These conditions would be similarly entered into CPO 100. As indicated in box 535, conditions could include the provision that a flight must arrive before midnight, a hotel room must be non-smoking, or a rental car must not be a compact. Conditions are the terms of CPO 100, allowing the buyer to tailor CPO 100 for his specific needs. Conditions may also be based on other conditions. For example, one condition might state that four out of five other specified conditions must be met. Alternatively, each condition of CPO 100 could be given a point value, with CPO 100 requiring only that conditions be satisfied up to a certain total point value. For example, the buyer may indicate that a window seat is worth two points, an aisle seat one point, a nonstop flight four points, etc. CPO 100 could require that ten "points" must be met in order to satisfy the conditions of CPO 100. Conditions could also indicate that for twenty-four hours following the first attempted binding of CPO 100, other sellers may make offers to bind, with the original binding seller completing the contract only if no better offer has been received. Conditions could even be based on external events. For example, the buyer could create CPO 100 which offered to buy airline tickets only in the event that it was snowing in November in the destination city.

At step 540, the buyer adds an expiration date to CPO 100, if desired. This allows a buyer to post CPO 100 without worrying that he will later be bound after his needs have changed. At step 550, the buyer enters a price. In a CPO 100 for a rental car, for example, the buyer may enter a price of fifty dollars for a three day rental. At step 560, the buyer attaches his name or a unique user ID number to CPO 100. This ID number is received from central controller 200 when the buyer registers for the service, or is chosen by the buyer and then registered with central controller 200 by phone. Central controller 200 maintains a database of buyer ID numbers in buyer database 255, and issues (or allows) only unique numbers. If less security is required, the user's telephone number could serve as the ID number since it has the advantages of being both unique and easily remembered. If additional security is required, those procedures described in the cryptographic embodiment may be implemented.

Once the above elements have been developed, the buyer transmits them to central controller 200 at step 570. The buyer does this by clicking on a "send" button located on the screen in which he entered the terms of CPO 100. At step 580, boilerplate legal language is added to the components of CPO 100 to form a complete CPO 100. The legal language is pulled from contract detail database 280 which stores a plurality of paragraphs. These paragraphs are linked together with the above contract elements to form a complete CPO 100. The only element missing which prevents CPO 100 from being recognized as a legitimate contract is the name and signature of the seller.

Instead of a world wide web-based interface, buyers may also transmit CPO 100 data via electronic mail, voice mail, facsimile, or postal mail transmissions. With voice mail, the buyer calls central controller 200 and leaves CPO 100 in audio form. These CPOs 100 may be transcribed into digital text at central controller 200, or made available to potential sellers in the same audio format. In a postal mail embodiment, central controller 200 acts more like a router, directing CPOs 100 to the potential sellers, creating multiple copies of CPO 100 if necessary. CPO 100 may also be posted to bulletin boards or web pages operated by central controller 200. Central controller 200 supports a plurality of transmission methods, allowing for a wide variety of formats of CPOs 100. Some formats may be changed, however, before further processing by central controller 200. CPOs 100 transmitted by mail in paper form, for example, may be scanned-in and digitized, using optical character recognition software to create digital text. These embodiments are more fully described in the off-line embodiment described later.

Figure 6:
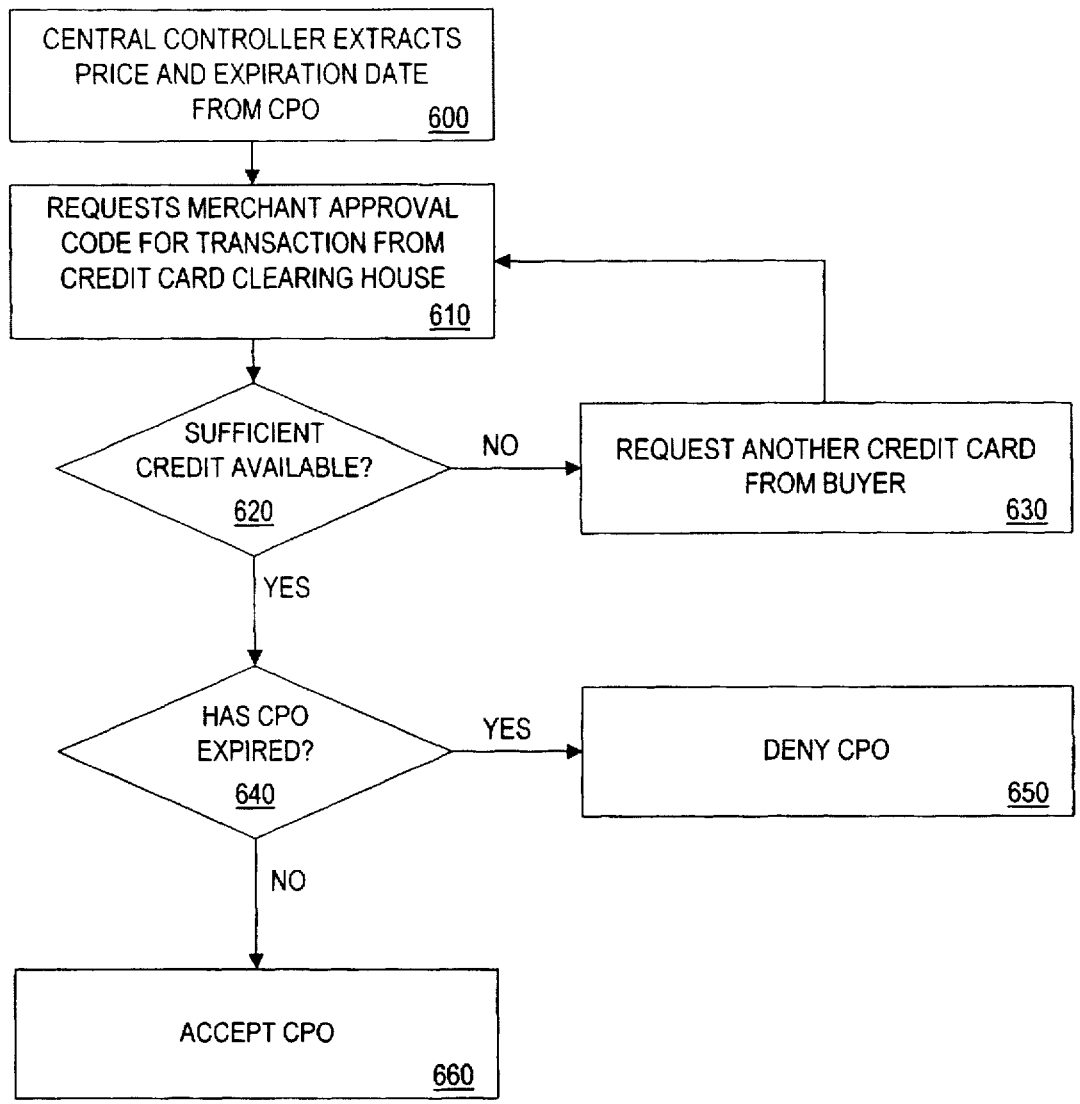
FIG. 6 illustrates an embodiment showing the acceptance of a conditional purchase offer by the central controller.

Referring now to FIG. 6, CPO 100 is received and checked to see that sufficient credit is available to cover the stated price of CPO 100, before CPO 100 is made available to potential sellers. At step 600, central controller 200 extracts price and expiration date information from CPO 100. At step 610, payment processor 230 submits a pre-authorization of the price of CPO 100 to the credit card clearinghouse. This serves to "lock up" a portion of the available credit on the buyer's credit card, preventing him from using up this credit while CPO 100 is still active. At step 620, the credit card clearinghouse responds to the pre-authorization, indicating whether sufficient credit is available. If sufficient funds are not available to cover the price of CPO 100, another credit card number is requested from the buyer at step 630. Once an additional credit card number has been transmitted, central controller 200 then resubmits the pre-authorization at step 610. At step 640, the expiration date of CPO 100 is checked to see if it has already expired. If it has expired, CPO 100 is rejected at step 650 and returned to the buyer. If CPO 100 has not yet expired, it is accepted at step 660.

Figure 7:
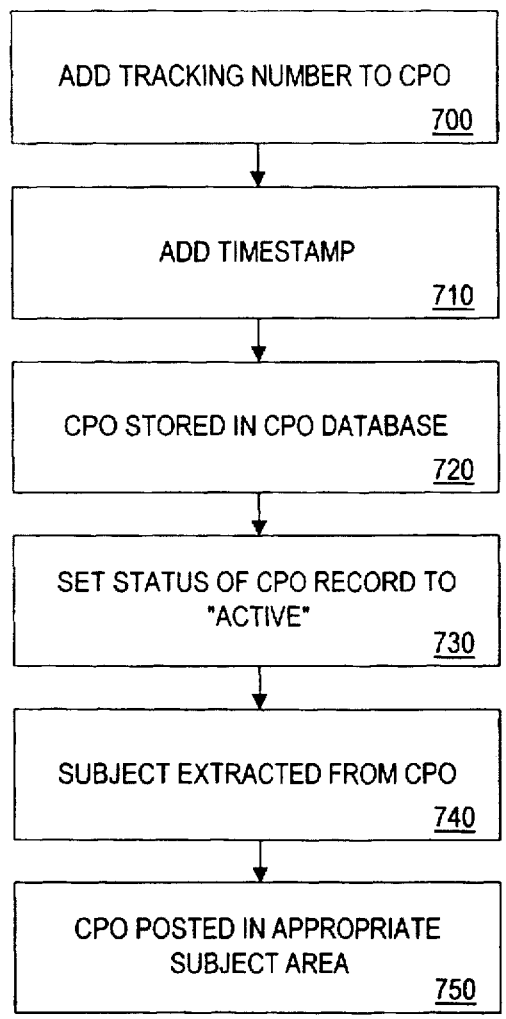
FIG. 7 illustrates an embodiment showing the activation of a conditional purchase offer.

Referring now to FIG. 7, there is illustrated an embodiment in which CPO 100 is activated and made available to potential sellers. At step 700, a unique tracking number is added to CPO 100. Central controller timestamps CPO 100 at step 710, and then stores CPO 100 in CPO database 265. CPO database 265 contains a record for each CPO 100, and includes fields such as status, subject, tracking number, timestamp, description of goods, price, expiration date, conditions, and buyer ID number. The status field has values of "pending," "active," "expired," and "completed." A status of "pending" means that the CPO is not currently available to potential sellers. Either it is still being processed by central controller 200, or it has been temporarily suspended by the buyer. An "active" CPO 100 is available to potential sellers and can be bound. An "expired" CPO 100 can no longer be bound. CPOs 100 which have been bound by a seller have a status of "completed."

After being stored at step 720, CPO 100 may go through a series of processing steps. One step, if necessary, is language translation, either creating a standard language that all CPO 100s must be written in, or translating to the language most appropriate for the sellers to which it will be sent. This translation is provided by language experts at central controller 200, or by automatic translation software such as Systran Professional, manufactured by Systran Software. Twelve bi-directional language combinations are available, including English to/from French, Italian, German, Spanish, Portuguese, and Japanese. Another step, if necessary, is to edit for spelling or grammatical errors. CPO 100 might also be reviewed for clarity. Any CPO 100 with an unclear term or condition would be returned to the buyer for clarification. A buyer listing a destination city of "Chikago" might have CPO 100 returned for clarification or correction.

Referring again to FIG. 7, the status of the database record for CPO 100 is set to "active" at step 730. At step 740, the subject of CPO 100 is extracted from the subject field. At step 750, CPO 100 is posted in an appropriate subject area. This allows central controller 200 to display CPO 100 only to the most appropriate sellers. In a world wide web environment, central controller 200 has a web page for each possible subject area. Thus all CPOs 100 requesting airline tickets would be displayed on the airline ticket web page. This makes it much easier for potential sellers to find appropriate CPOs 100 they might want to bind as they can go right to the subject whose goods they can provide. In an alternative embodiment, CPO 100 is electronically mailed to potential sellers, either individually or in groups. Potential sellers could elect to receive all CPOs 100, only those CPOs 100 in their subject area, or a subset of CPOs 100 representing a particular condition. For example, a car rental company might request that all car rental CPOs 100 for luxury cars be sent to them.

In an embodiment in which CPOs 100 are being transmitted to the seller, it is important to note that there are a number of hardware options for seller interface 300. Suitable seller interfaces 300 include fax machines, PDAs with wireless connections, and beepers or pagers. For example, a rare coin dealer could instruct central controller 200 to beep him whenever CPO 100 appeared for Morgan Silver Dollars, providing details of CPO 100 over the beeper network, or informing the seller to log on to central controller 200 for further details.

Figure 8:
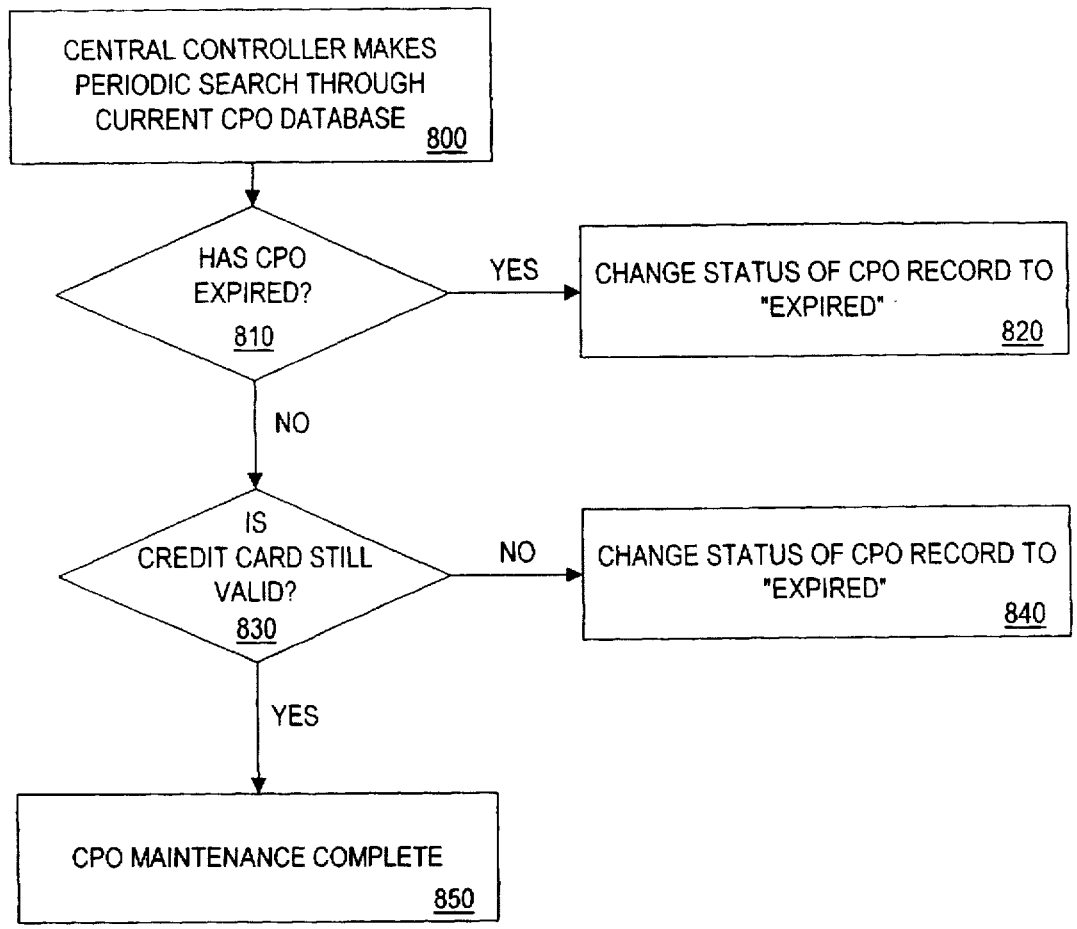
FIG. 8 illustrates one embodiment of the maintenance of active conditional purchase offers.

Referring now to FIG. 8, there is illustrated a procedure for the maintenance of CPOs 100. At step 800, central controller 200 searches CPO database 265. At step 810, the expiration date field of each database record of CPO 100 is compared to the current date. If the expiration date of CPO 100 is earlier than the current date, the status of CPO 100 is changed to "expired" at step 820. At step 830, payment processor 230 contacts credit card clearinghouse to verify that the buyer's credit card is still valid. If the card is not valid, the status of CPO 100 is changed to "expired" at step 840. The maintenance process is completed at step 850 once all "active" CPO 100 database records have been examined.

Figure 9:
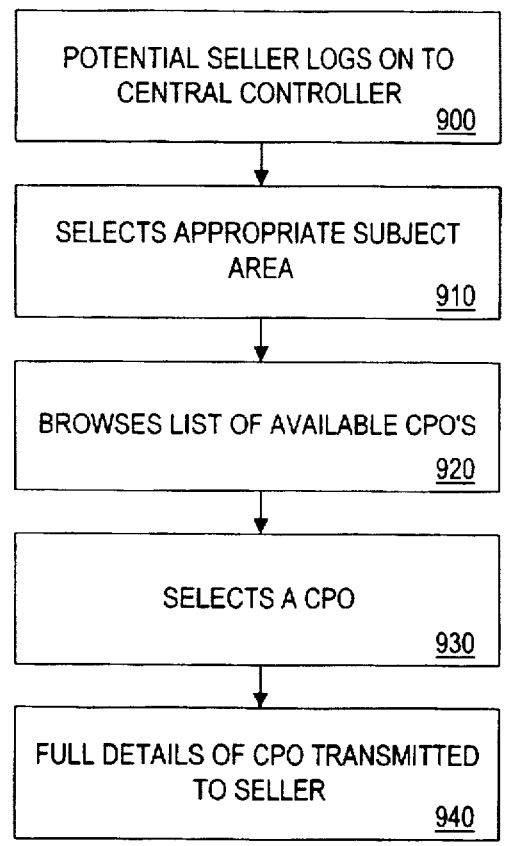
FIG. 9 illustrates an embodiment showing the seller selecting a conditional purchase offer.

FIG. 9 illustrates the process by which a potential seller selects CPO 100. At step 900, the potential seller logs onto central controller 200 using modem 350 of seller interface 300. At step 910, the potential seller selects an appropriate subject area. For example, a large Chicago hotel that had just experienced the cancellation of a block of rooms for a convention might search in the hotel subject area in the hopes of finding a CPO 100 requesting a room in Chicago on those dates. At step 920, the potential seller browses the list of available CPOs 100 (i.e. those with a status of "active"). CPOs 100 may be listed with minimal details, with additional information available only if the potential seller is interested in binding CPO 100. A hotel CPO 100 might be listed as "hotel—Sep. 16, 1996—Chicago—single occupancy—$85." A potential seller wanting more information about CPO 100 may request additional data at step 940. In one embodiment, each CPO 100 is hyperlinked to a separate web page which provides complete details. The potential seller clicks on CPO 100 and is immediately transferred to the page of supporting detail. This detail might include the required type of bed, fitness facilities, and restaurants. In another embodiment, CPO 100 is electronically transmitted directly to the seller, via electronic mail, fax, telephone, beeper, etc.

Figure 10:
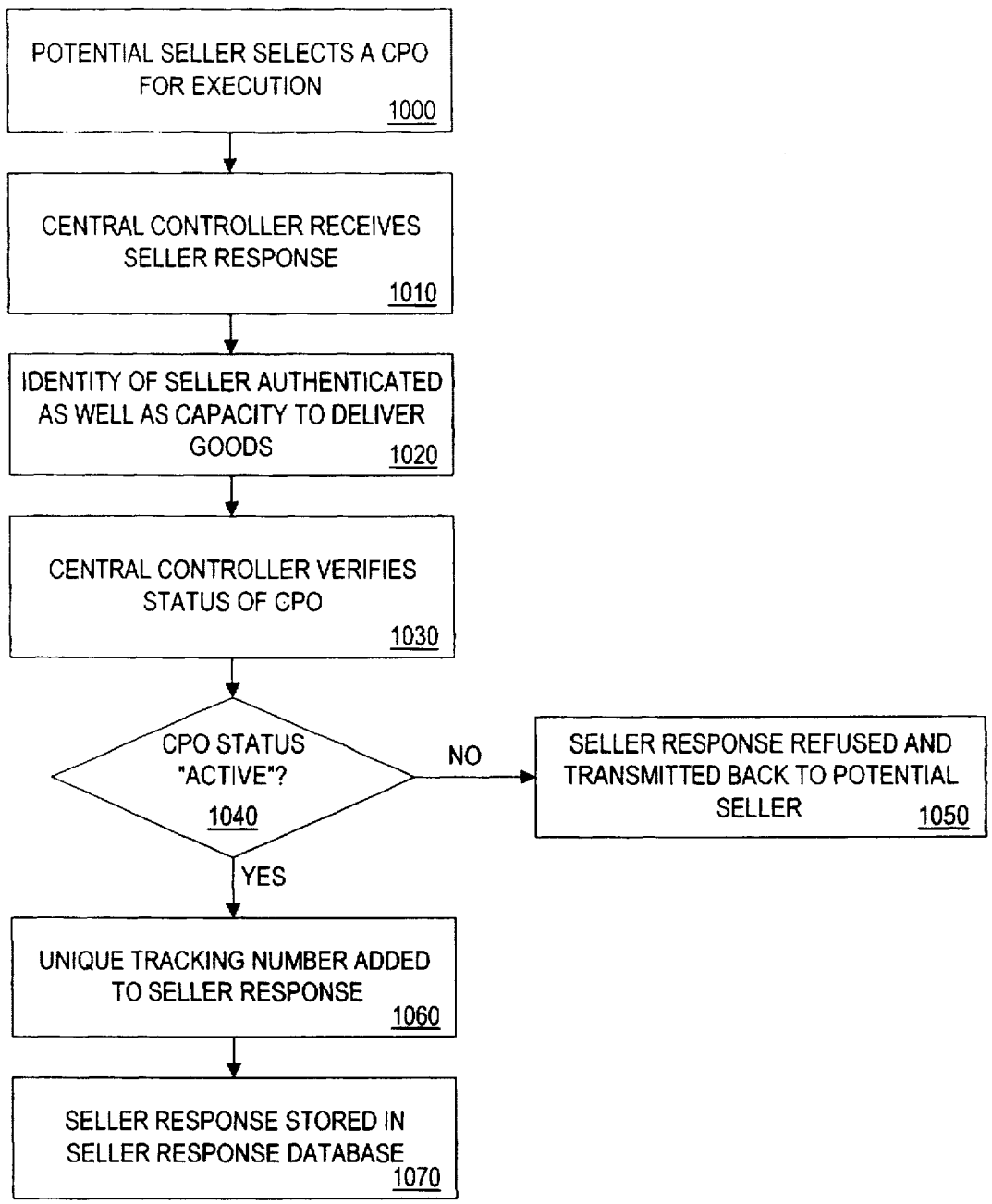
FIGS. 10 and 11 illustrate an embodiment showing the binding of a conditional purchase offer.
Figure 11:
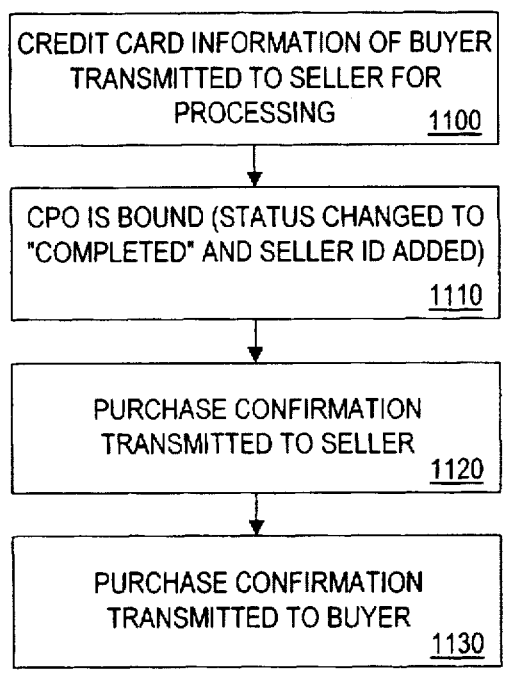

FIGS. 10 and 11 illustrate the process by which CPO 100 is bound by a seller. At step 1000, the potential seller selects CPO 100 which he would like to bind, developing seller response 110 which represents his intention to bind. At step 1010, central controller 200 receives seller response 110 from the potential seller. Central controller 200 then timestamps seller response 110 and authenticates the identity of the seller, as well as verifying his probable capacity to deliver the goods. The timestamp allows central controller 200 to determine the first unconditional acceptance to be received. If two seller responses 110 are received within a few seconds of each other, the timestamp allows central controller 200 to decide which was received first. Alternatively, the timestamp may be appended to seller response 110 at the time it is transmitted from seller interface 300, using clock 335 of seller interface 300.

Authentication of the seller's identity involves central controller 200 extracting the seller ID from seller response 110 and looking up the seller's identity in seller database 260. Information in seller database 260 then provides an indication of the seller's ability to deliver the goods. Before a seller can bind CPO 100 for an airline ticket, for example, central controller 200 must authenticate that the seller is an airline. If necessary, central controller 200 may verify that the seller can provide the specific good requested. Rather than just verifying that the seller is an airline, central controller 200 may verify that it serves the city pairs requested by the buyer. In another embodiment, the seller incorporates seller response 110 into CPO 100, signing CPO 100 by adding an indication that the contract is agreed to. This indication could be a digital signature, or could involve adding a symbol or indicia representative of the seller.

Central controller 200 then verifies the status of CPO 100 at step 1030, determining whether or not the status of CPO 100 is "active" at step 1040. If CPO 100 is currently "active," a unique tracking number is added to seller response 110 at step 1060. Central controller 200 then stores seller response 110 in seller response database 270 at step 1070. If the status of CPO 100 is not "active" at step 1040, seller response 110 is refused by central controller 200 and transmitted back to the potential seller at step 1050.

In another embodiment, the seller transmits seller response 110 directly to the buyer at step 1010. The buyer may then send seller response 110 to central controller 200 for verification and authentication, or he may choose to accept seller response 110 without verification and authentication.

In FIG. 11, the payment process is begun at step 1100 when the credit card number and approval code for the selected CPO 100 is transmitted to the seller. At step 1110 CPO 100 is bound, turning CPO 100 into a legally binding contract between the buyer and seller. The binding process requires that the status of CPO 100 be changed to "completed," preventing subsequent sellers from being able to bind CPO 100. The binding process also requires that the seller ID be added to CPO 100. At step 1120, central controller 200 sends purchase confirmation 120 to the seller and then sends it to the buyer at step 1130.

In another embodiment, multiple sellers may bind CPO 100. In this case, CPO 100 may maintain its status of "active" until a given number of sellers have responded, and only then is the status of CPO 100 changed to "completed." For example, a rare coin dealer may post CPO 100 offering a hundred dollars for a specific type of coin. A condition of CPO 100 may state that the offer is open to the first ten sellers to respond, allowing for ten bindable contracts. Another option is to open CPO 100 to any number of bindings, or any number of bindings up to the funds available by the buyer.

There are many methods by which the providers of the system could derive a revenue stream. In one embodiment, a flat fee is charged for every CPO 100 submitted. There could also be flat fees that would cover any number of CPOs 100 over a given period of time, allowing buyers to subscribe to the service much as they would subscribe to a newspaper. In another embodiment, central controller 200 calculates a discounted value of the price in which sellers receive only a percentage of the price of CPO 100. In another embodiment, advertisers pay to have messages listed along with CPOs 100, supplementing the costs of operating the system. Alternatively, the method and apparatus of the present invention may be employed without a payment feature.

Figure 12:
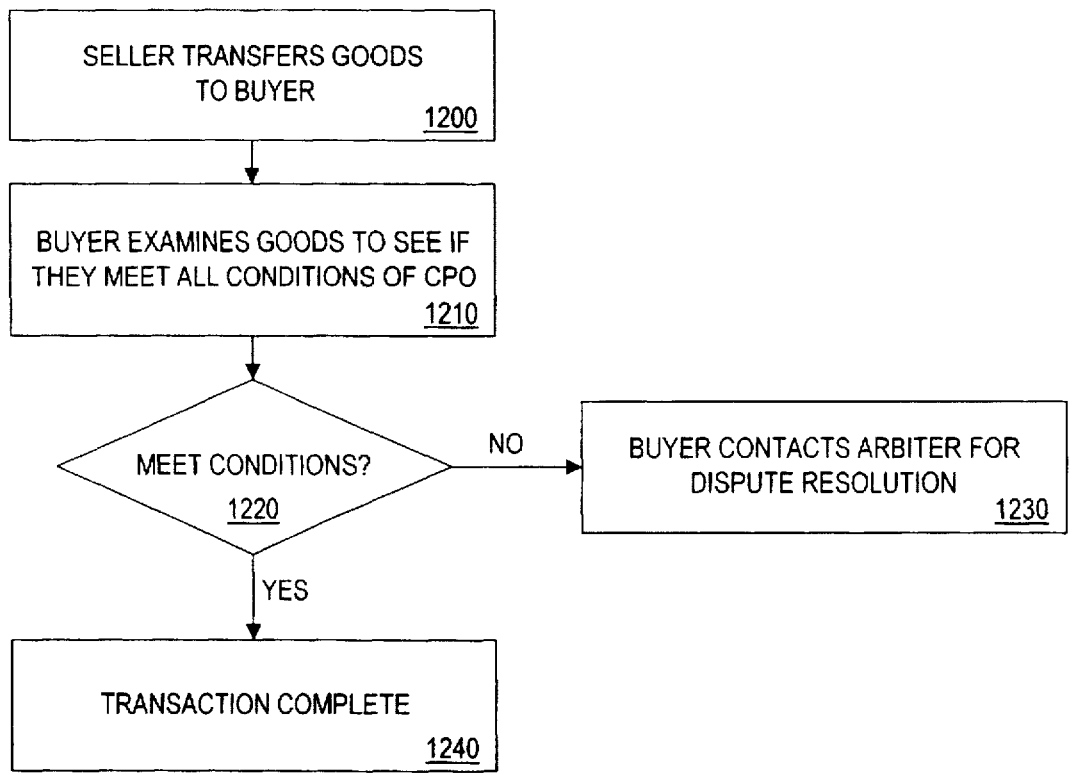
FIG. 12 illustrates an exemplary procedure for exchanging goods and payment between buyer and seller.

FIG. 12 illustrates the exchange of goods between buyer and seller. At step 1200, the seller transfers the specified goods to the buyer. This transfer could involve the delivery of physical goods as well as digital goods. Physical goods might include cars, jewelry, computer equipment, etc. Digital goods might include documents, tickets, access codes, etc. A hotel, for example, might transfer a confirmation number to the buyer, to be presented upon check-in at the hotel. At step 1210, the buyer examines the delivered goods to see if they meet all conditions and terms of CPO 100. A buyer purchasing a hotel room, for example, would verify that the room was for the correct date and was in the correct city. At step 1220, if the goods do not meet the buyer's conditions as described in CPO 100 the buyer contacts an arbiter at central controller 200 for dispute resolution. This process is described in more detail in the dispute resolution embodiment described later. At step 1240 the transaction is complete.

Payment Preferences

Figure 13:
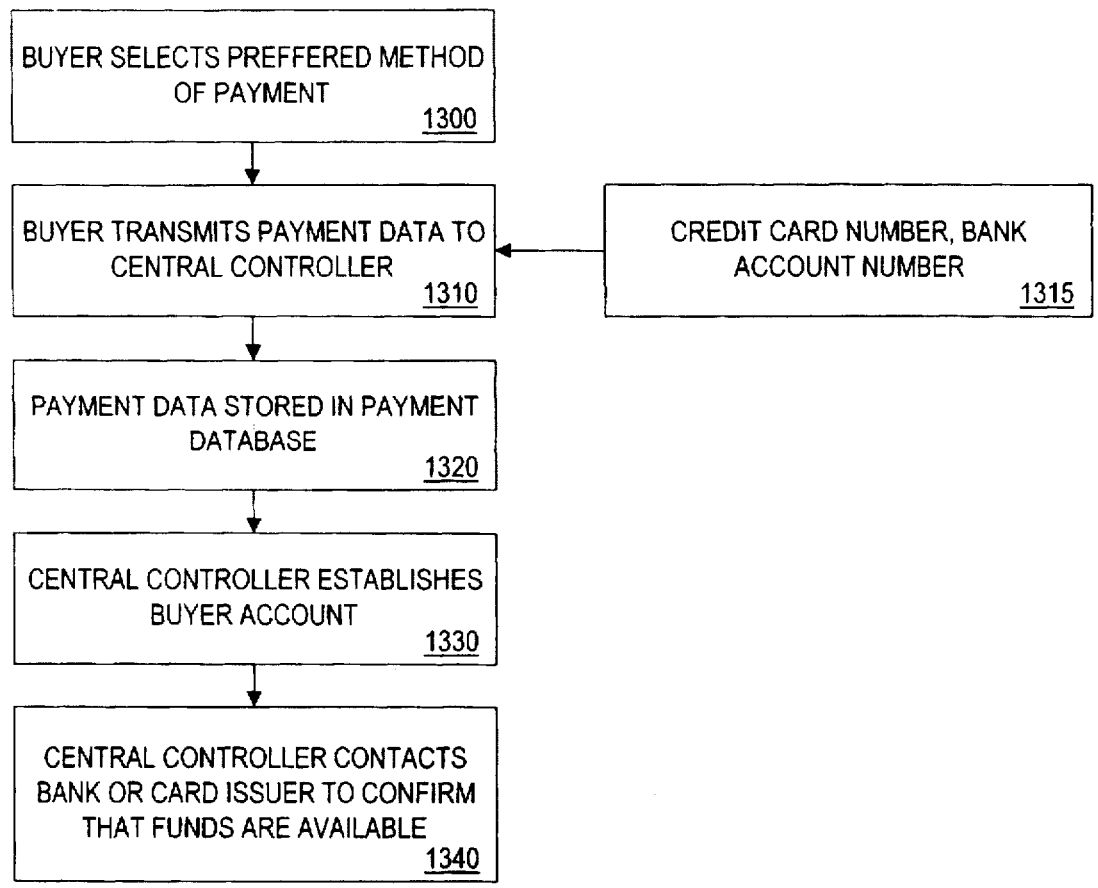
FIG. 13 illustrates an exemplary payment method.

FIG. 13 illustrates a protocol in which central controller 200 establishes buyer account 297. At step 1300, the buyer selects his preferred method of payment. Preferred methods might include credit cards, personal checks, electronic funds transfer, digital money, etc. At step 1310, the buyer transmits payment data corresponding to his preferred method of payment to central controller 200. As indicated by box 1315, such payment data might include credit card number or bank account number. These payment methods are meant to be merely illustrative, however, as there are many equivalent payment methods commonly known in the art which may also be used. If the buyer wants to pay by credit card, for example, payment data would include his credit card account number, expiration date, name of issuing institution, and credit limit. For electronic funds transfer, payment data includes the name of the buyer's bank and his account number. At step 1320, central controller 200 stores payment data and payment preferences in payment database 285.

At step 1330, central controller 200 establishes buyer account 297 which either stores money transferred by the buyer or serves as a pointer to an account of the buyer outside the system. For buyers using credit cards, for example, buyer account 297 contains the credit card number, expiration date, and name of issuing institution. Buyers could also transfer money to central controller 200 to be stored in buyer account 297, which would operate like a conventional checking account. Central controller 200 would send a check to the seller written on buyer account 297. Alternatively, central controller 200 could electronically move the funds directly from buyer account 297 to seller account 298. At step 1340, central controller 200 contacts the bank or card issuer to confirm that funds are available. A buyer is thus unable to use a credit card with no credit available to establish buyer account 297.

The above protocols may be similarly applied to sellers, allowing for the creation of seller account 298. The primary difference being that seller account 298 is primarily used for deposits, with money flowing from seller to buyer in the case of deposit returns or refunds when the buyer does not find the received goods acceptable. Verification of funds available is therefore not as important for sellers.

Although the on-line embodiment describes a protocol in which central controller 200 transmits credit card information to the seller for processing, there are of course many payment protocols under which payment may be transferred from buyer to seller. In one embodiment, processing the credit card is performed by central controller 200, not the seller. Central controller 200 looks up the credit card number of the buyer in payment database 285. This credit card number is transmitted to payment processor 230. Payment processor 230 contacts the credit card clearinghouse to get an authorization number. The billable amount appears on the credit card statement of the buyer in his monthly statement. The clearinghouse posts this amount to seller account 298. Central controller 200 updates payment database 285 to indicate that payment has been made. Central controller 200 could also arrange for payment to be made directly between buyer and seller by providing payment information to each party. The buyer, for example, might receive the checking account number of the seller. Account information could also be embedded into CPO 100 and seller response 110, allowing buyer and seller to complete payment once they each had a copy of CPO 100.

Another method of payment involves procedures using digital cash. Central controller 200 looks up the buyer's electronic delivery address in payment database 285. This address is transmitted to payment processor 230, with the digital cash being downloaded from the buyer. Central controller 200 updates payment database 285 to indicate that payment has been made. This address might be an electronic mail address if the digital cash is to be transferred by electronic mail, or it could be an Internet Protocol address capable of accepting an on-line transfer of digital cash. This electronic delivery address is sent to payment processor 230. The digital cash is downloaded to seller account 298 or directly to the seller. Central controller 200 then updates payment database 285 to indicate that payment has been made. Using these digital cash protocols, it is possible for the buyer to include payment along with CPO 100 in electronic form.

The practice of using digital cash protocols to effect payment is well known in the art and need not be described here in detail. For reference, one of ordinary skill in the art may refer to Daniel C. Lynch and Leslie Lundquist, *Digital Money*, John Wiley & Sons, 1996; or Seth Godin, *Presenting Digital Cash*, Sams Net Publishing, 1995.

Delayed Payment Embodiment

Although the on-line embodiment describes a protocol in which sellers receive payment immediately upon binding CPO 100, other embodiments may be implemented in which payment is delayed until the goods have been received by the buyer, or delayed until some predetermined date. Partial payments and installment payments are also supported by the system Escrow account 299 allows payment to be delayed until the seller completes delivery of the goods, while at the same time ensuring that the buyer will in fact make payment. Central controller 200 establishes escrow account 299 as a temporary holding account. When the seller binds CPO 100 at step 1110, funds are transferred from buyer account 297 to escrow account 299. Only after the goods have been received by the buyer are funds transferred from escrow account 299 to seller account 298. The buyer may transmit a digitally signed release message to central controller 200, authorizing the release of the escrowed funds to the seller.

In another embodiment, the buyer makes a partial payment when CPO 100 is bound, and then completes payment when the goods are received. The fraction of the offered price of CPO 100 to be paid upon binding is a condition of CPO 100 and is stored in payment database 285 when CPO 100 is bound. Central controller releases this portion of the funds at step 1110, and then releases the remaining portion after goods have been delivered at step 1200. The partial payment made upon binding may be non-refundable. This would allow a hotel, for example, to sell hotel room reservations that are cancelable on two days notice, with cancellations within the two day period resulting in forfeiture of deposit.

In yet another embodiment, CPO 100 describes the use of installment payments. The first payment is made when CPO 100 is bound, followed by regular payments as specified in the conditions of CPO 100. The dates at which payments are to be made are stored in payment database 285.

Counteroffer Embodiment

In one embodiment of the present invention, sellers respond to CPO 100 not by binding it, but by making a counteroffer with modified and/or additional conditions. An airline, for example, might view CPO 100 for a first class ticket for five hundred dollars. The airline may be willing to sell for six hundred dollars, and thus want to develop and issue a counteroffer rather than electing to bind CPO 100. This counteroffer is similar to CPO 100 except that the buyer is binding the seller instead of the seller binding the buyer. The counteroffer is also directed to a specific party (the buyer), unlike CPO 100 which may be directed to a plurality of sellers.

Figure 18:
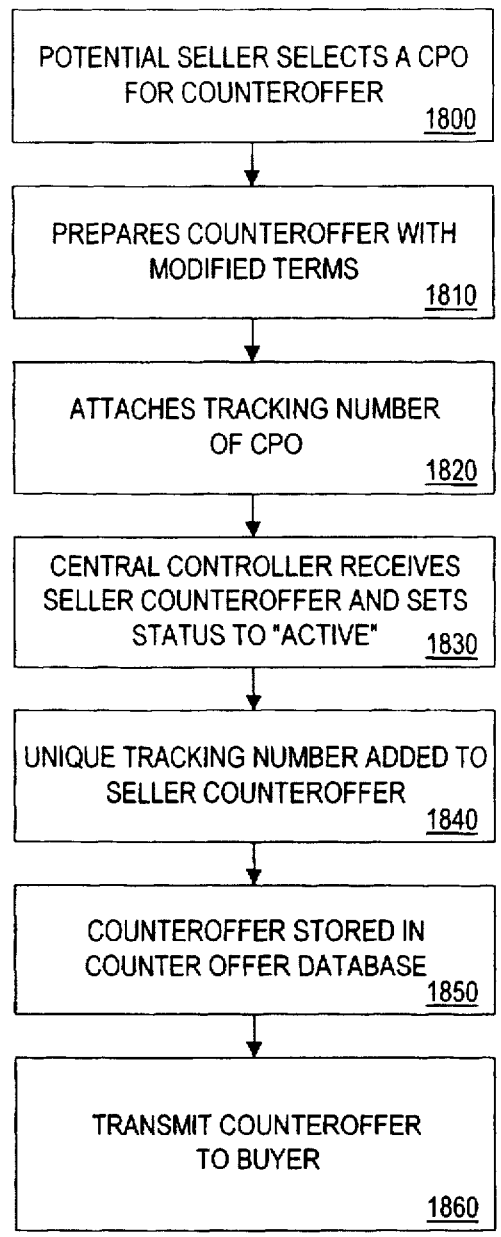
FIGS. 18 and 19 illustrate an exemplary embodiment for counteroffers by a seller.

FIG. 18 illustrates the development of counteroffer 140. At step 1800, the potential seller selects CPO 100 for which he wants to make a counteroffer. At step 1810, the seller prepares counteroffer 140 with modified conditions. The seller follows the same process that the buyer uses to generate CPO 100 (steps 500 through 580), selecting the conditions of counteroffer 140. Alternatively, the seller is presented with an electronic copy of CPO 100 and is allowed to edit those conditions that the seller wants to change. For example, a car rental company might take the buyer's request for a ten dollar per day luxury car and counteroffer with a twenty dollar per day compact car. At step 1820, the seller attaches the tracking number of CPO 100 to counteroffer 140. Central controller 200 receives counteroffer 140 at step 1830, setting the status to "active." Central controller 200 then adds a unique tracking number to counteroffer 140 at step 1840, and stores it in counteroffer database 267 at step 1850. Central controller 200 extracts the tracking number of CPO 100 attached to counteroffer 140 in order to find the buyer to whom counteroffer 140 is transmitted at step 1860.

Figure 19:
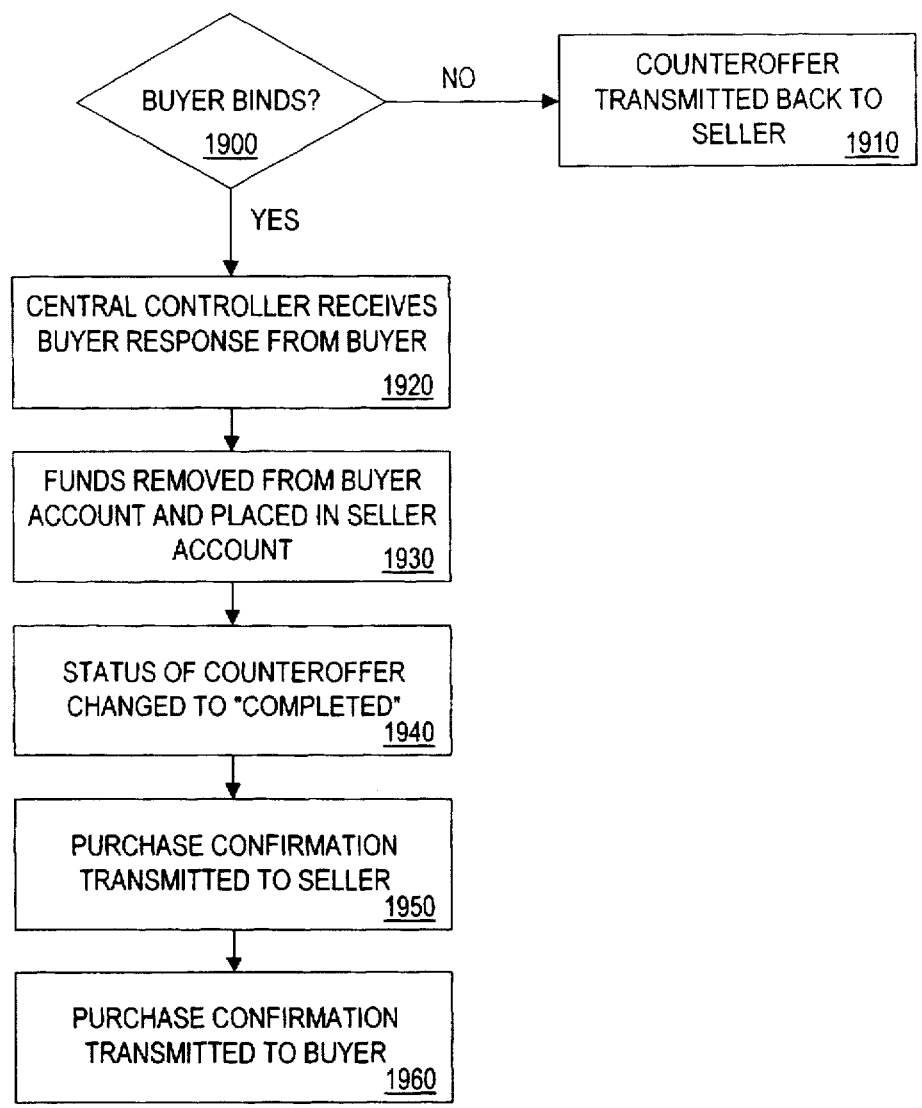

FIG. 19 illustrates the process by which the buyer responds to counteroffer 140. At step 1900, the buyer decides whether or not to bind counteroffer 140. If he does not bind, counteroffer 140 is transmitted back to the potential seller at step 1910. If the buyer does decide to bind, buyer response 150 is transmitted to central controller 200 at step 1920. At step 1930, finds are removed from buyer account 297 and placed in seller account 298. At step 1940, the status of counteroffer 140 is changed to "completed." Purchase confirmation 120 is transmitted to the seller at step 1950 and transmitted to the buyer at step 1960. Procedures for the exchange of goods are completed as described in FIG. 12.

Off-line Embodiment

In one embodiment of the present invention, buyers and sellers communicate in an off-line manner with central controller 200. Rather than sending electronic mail or using web-based servers, buyers and sellers use a telephone, fax machine, postal mail, or other off-line communication tool.

A buyer may use a telephone, for example, to generate CPO 100. The buyer calls central controller 200 and is connected with an agent. The buyer provides the terms of CPO 100 such as subject, description of goods, conditions, expiration date, price, etc. The buyer also provides his buyer ID, password, or private key so that central controller 200 can authenticate his identity. The agent puts this data into digital form by typing it into a terminal and then adds legal language to form CPO 100. CPO 100 is then transmitted to central controller 200 where it is made available to potential sellers as described in the on-line embodiment.

In an alternative embodiment, the buyer calls central controller 200 and is connected with a conventional Interactive Voice Response Unit (IVRU) which allows the buyer to enter some or all of the terms of CPO 100 without the assistance of a live agent. The buyer initially selects from a menu of subjects using the touch-tone keys of his phone, and then the call is either directed to a live agent specializing in that subject area, or the buyer is prompted for further terms of CPO 100.

Potential sellers may also use a telephone to browse and bind CPOs 100. The potential seller calls central controller 200 and selects a subject. Central controller 200 then converts the text of each CPO 100 into audio form, reading the entire list to the potential seller. At any time during the reading of CPOs 100, the potential seller may press a combination of keys on his telephone to select CPO 100 for binding. The seller enters seller ID number and is authenticated by central controller 200 prior to the binding of CPO 100. Potential sellers could also enter parameters before having the list of CPOs 100 read to them. An airline, for example, might request that all airline CPOs 100 for more than eight hundred dollars be read, skipping any CPO 100 with a lower price.

Buyers may also communicate with an agent at central controller 200 through faxes or postal mail. The agent receives the message and proceeds to digitize it and form CPO 100 as described above.

Cryptographic Authentication Embodiment

In the previous embodiments, authentication of the buyer and seller involves checking the attached ID or name and comparing it with those stored in seller database 260 and buyer database 255. Although this procedure works well in a low security environment, it can be significantly improved through the use of cryptographic protocols. These protocols not only enhance the ability to authenticate the sender of a message, but also serve to verify the integrity of the message itself, proving that it has not been altered during transmission. A small airline, for example, could be prevented from binding CPOs 100 requiring performance by a large carrier as their identity would not be authenticated. Encryption can also prevent eavesdroppers from learning the contents of the message. A competing airline, for example, could be prevented from reading any intercepted seller response 110 generated by another competitor. Such techniques shall be referred to generally as cryptographic assurance methods, and will include the use of both symmetric and asymmetric keys as well as digital signatures and hash algorithms.

The practice of using cryptographic protocols to ensure the authenticity of senders as well as the integrity of messages is well known in the art and need not be described here in detail. For reference, one of ordinary skill in the art may refer to Bruce Schneier, *Applied Cryptography, Protocols, Algorithms, And Source Code In C*, (2d Ed, John Wiley & Sons, Inc., 1996).

Figure 14:
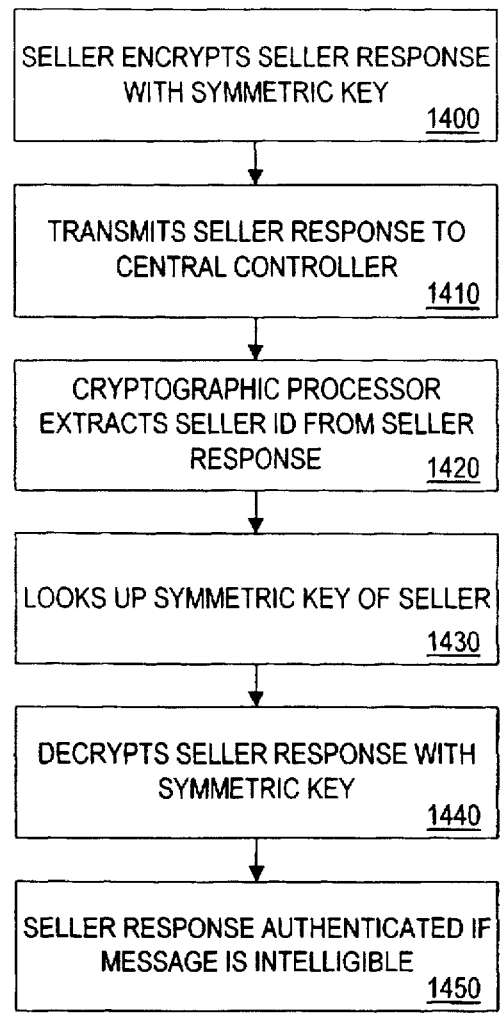
FIGS. 14 through 17 illustrate an exemplary authentication procedure using cryptographic protocols.

FIG. 14 describes a symmetric key embodiment in which the seller and central controller 200 share a key. Thus both encryption and decryption of seller response 110 are performed with the same key. This encryption may be implemented with an algorithm such as DES (U.S. Government standard, specified in FIPS PUB 46), or with any of several algorithms known in the art such as IDEA, Blowfish, RC4, RC2, SAFER, etc. The seller encrypts seller response 110 with his assigned symmetric key at step 1400, using cryptographic processor 310 of seller interface 300. The key may be stored in message database 370 or otherwise stored or memorized by the seller. The encrypted seller response 110 is then transmitted to cryptographic processor 210 of central controller 200 at step 1410. Cryptographic processor 210 extracts the seller ID from seller response 110 at step 1420 and looks up the symmetric key of the seller in cryptographic key database 290 at step 1430, decrypting seller response 110 with this key at step 1440. Cryptographic key database 290 contains algorithms and keys for encrypting, decrypting and/or authenticating messages. At step 1450, if the resulting message is intelligible, then it must have been encrypted by the same key, authenticating that the seller must have indeed been the author of seller response 110.

This procedure makes it significantly more difficult for an unauthorized seller to represent himself as a legitimate seller. Without cryptographic procedures, an unauthorized seller who obtained a sample seller response 110 from a legitimate seller would be able to extract the seller ID and then attach this ID number to unauthorized seller responses 110. When seller response 110 has been encrypted with a symmetric key, however, an unauthorized seller obtaining a sample seller response 110 only discovers the seller's ID number, not the symmetric key. Without this key, the unauthorized seller cannot create a seller response 110 that will not be discovered by central controller 200, since he cannot encrypt his message in the same way that the authorized seller could. The symmetric key protocol also ensures that seller response 110 has not been tampered with during transmission, since alteration of the message requires knowledge of the symmetric key. An encrypted seller response 110 also provides the seller with more anonymity.

Figure 15:
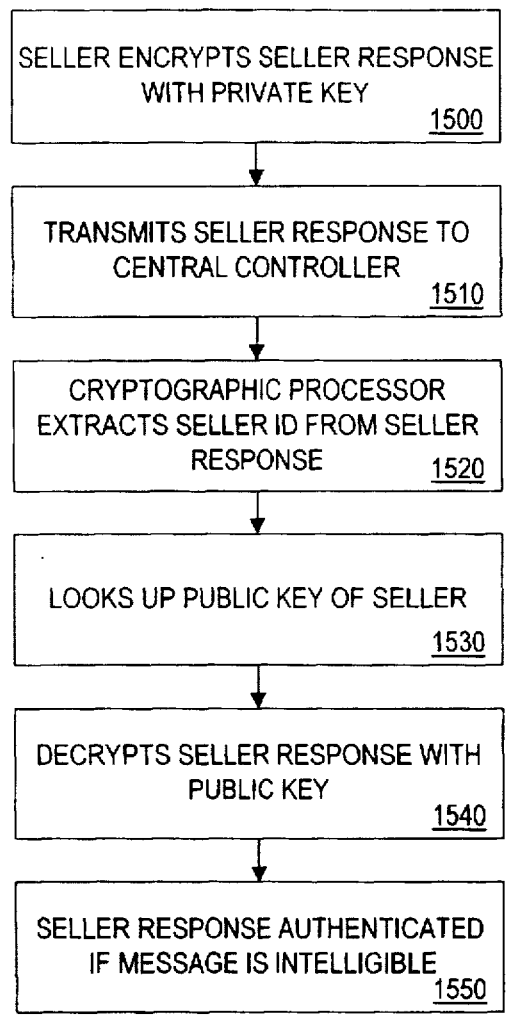

Referring now to FIG. 15, there is shown an asymmetric key protocol in which seller response 110 is encrypted with a private key and decrypted with a public key. Two such algorithms for this procedure are RSA and DSA. At step 1500, the seller encrypts seller response 110 with his private key using cryptographic processor 310, transmitting seller response 110 to central controller 200 at step 1510. Cryptographic processor 210 extracts the seller ID at step 1520 and looks up the seller's associated public key in cryptographic key database 290 at step 1530, decrypting seller response 110 with this public key at step 1540. As before, if seller response 110 is intelligible then central controller 200 has authenticated the seller at step 1550. Again, unauthorized sellers obtaining seller response 110 before it was received by central controller 200 are not able to undetectably alter it since they do not know the private key of the seller. Unauthorized sellers would, however, be able to read the message if they managed to obtain the public key of the seller. Message secrecy is obtained if the seller encrypts seller response 110 with his public key, requiring the attacker to know the seller's private key to view seller response 110.

Figure 16:
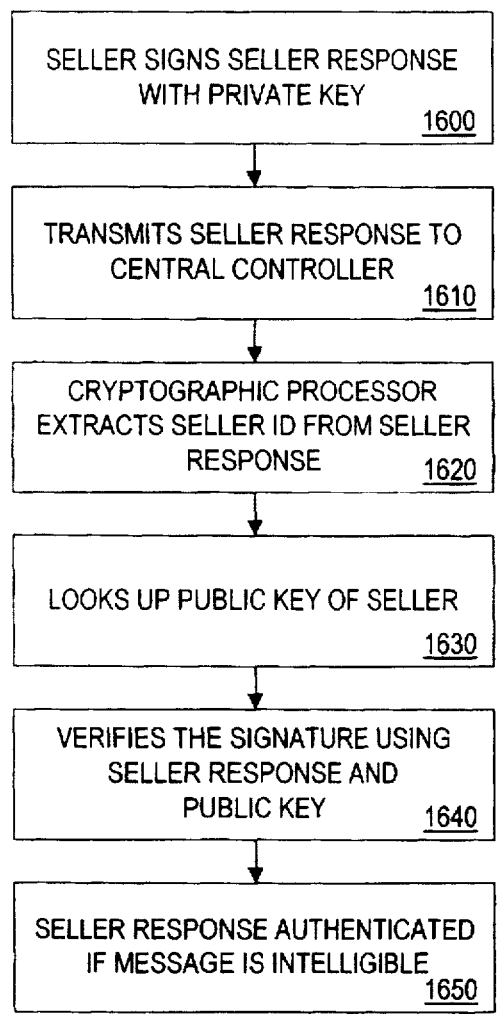

FIG. 16 shows a cryptographic technique using digital signatures to provide authentication and message integrity. One such algorithm is DSA (Digital Signature Algorithm), the U.S. Government standard specified in FIPS PUB 186. As in the asymmetric protocol described above, each seller has an associated public and private key. The seller signs seller response 110 with his private key at step 1600 with cryptographic processor 310 and transmits it to central controller 200 at step 1610. Central controller cryptographic processor 210 extracts the seller ID at step 1620 and looks up the seller's public key at step 1630, verifying the signature using seller response 110 and the public key of the seller at step 1640. If seller response 110 is intelligible, then central controller 200 accepts seller response 110 as authentic at step 1650.

Figure 17:
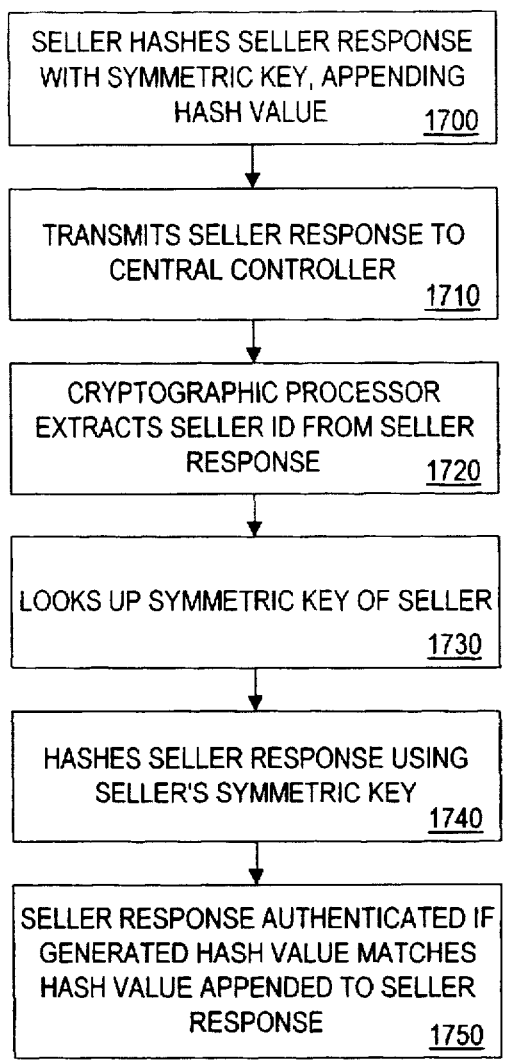

Referring now to FIG. 17, there is described a cryptographic technique using message authentication codes for verifying the authenticity and integrity of seller response 110. In the hash protocol of the present invention, the seller and central controller 200 share a symmetric key, which the seller includes in a hash of seller response 110 at step 1700. In the hash protocol, a one-way function is applied to the digital representation of seller response 110, generating a code that acts much like the fingerprint of seller response 110. Any of the MAC algorithms, such as RIPE-MAC, IBC-Hash, CBC-MAC, and the like may be applied in this application. After transmitting seller response 110 to central controller 200 at step 1710, cryptographic processor 210 extracts seller ID from seller response 110 at step 1720. Then cryptographic processor 210 looks up the seller's symmetric key at step 1730 and hashes seller response 110 with this symmetric key at step 1740, comparing the resulting hash value with the hash value attached to seller response 110. If the values match at step 1750, the integrity of seller response 110 is verified along with the authenticity of the seller.

Although cryptographic techniques can provide greater confidence in the authenticity of seller response 110, they are useless if the seller's cryptographic keys are compromised. An attacker obtaining the symmetric key of another seller is indistinguishable from that seller in the eyes of central controller 200. There is no way to know whether the seller was the true author of seller response 110, or an attacker with the right cryptographic keys. One way to solve this problem (known as undetected substitution) is to use biometric devices such as a fingerprint reader, voice recognition system, retinal scanner and the like. These devices incorporate a physical attribute of the seller into seller response 110, which is then compared with the value stored in seller database 260 at central controller 200. In the present invention, such devices attach to seller interface 300.

Fingerprint verification, for example, may be executed before the creation of seller response 110, during the generation of seller response 110 in response to prompts from central controller 200, at some predetermined or random times, or continuously by incorporating the scanning lens into seller interface 300 such that the seller is required to maintain his finger on the scanning lens at all times for continuous verification while seller response 1 0 is generated.

An example of such an identification device is the FC100 FINGERPRINT VERIFIER available from Startek, a Taiwanese company. The FC100 is readily adaptable to any PC via an interface card. The fingerprint verifier utilizes an optical scanning lens. The seller places his finger on the lens, and the resulting image is scanned, digitized, and the data compressed and stored in memory. Typically, a 256 byte file is all that is required. Each live-scan fingerprint is compared against the previously enrolled/stored template, stored in data storage device 360. If the prints do not match, the cryptographic algorithms executed by cryptographic processor 335 may prevent the seller from generating a seller response 110.

In a voice verification embodiment, the seller's voice is used to verify his identity. This embodiment has the advantage of not requiring the use of any specialized hardware since it can be implemented over a standard phone connection. The seller's identity is verified at central computer 200. The process of obtaining a voice-print and subsequently using it to verify a person's identity is well-known in the art, and therefore need not be described in detail herein. One of ordinary skill in the art may refer to SpeakEZ, Inc. for voice identification/verification technology. Conventional speaker identification software samples the seller's voice. This sample is stored at central controller 200 in seller database 260. Each time the seller wants to transmit seller response 110 to central controller 200, he is required to call central controller 200 and speak into the phone at the prompt for a voice sample. If this sample matches that stored in seller database 260, the seller is provided a password which is incorporated into the digital signature appended to seller response 110. Any seller response 110 received without an appropriate voice match password is not accepted. The voice-print may also be stored in a database within data storage device 360 of seller interface 300, to verify the seller's identity locally prior to allowing seller response 110 to be created.

Although the above cryptographic and biometric protocols describe the authentication and validation of seller response 110, they may be equally applied to the authentication and validation of CPO 100, counteroffer 140, buyer response 150, purchase confirmation 120, or any other message or communication between buyers, sellers, and central controller 200.

Anonymous Transactions Embodiment

As mentioned previously, the present invention provides for the anonymity of both buyers and sellers. Such anonymity is accomplished by eliminating all references to the names of the individuals for all transactions. A buyer, for example, would include his ID in CPO 100 rather than his name, preventing the seller receiving CPO 100 from discovering the buyer's identity. This is desirable if the buyer were a biotech firm that did not want rivals to know the type of lab equipment that the company was looking for.

In a similar manner, sellers may also want to keep their identity a secret. An airline might not want the public to know that they are heavily discounting fares between certain cities.

Although using ID numbers can provide anonymity, both for buyers and sellers, there are a number of potential weaknesses. First, if the database of ID numbers, stored in buyer database 255 or seller database 260, and their respective buyers/sellers is compromised, anonymity is destroyed since the message sender can be looked up in buyer database 255 or seller database 260. To prevent this, the ID numbers are encrypted with the public key of central controller 200, so that even if it is stolen it is useless without the private key.

Although we have described only one possible method for maintaining anonymity, there are other equivalents. For example, if the embodiment included telephone messaging, the identity of the buyer and seller could be maintained using conventional voice modification techniques. If CPO 100 or seller response 110 were in a paper form, the form could be scanned using optical character recognition and translated into digital form, discarding any information that could be found in the original document.

Trusted Server Embodiment

Figure 20:
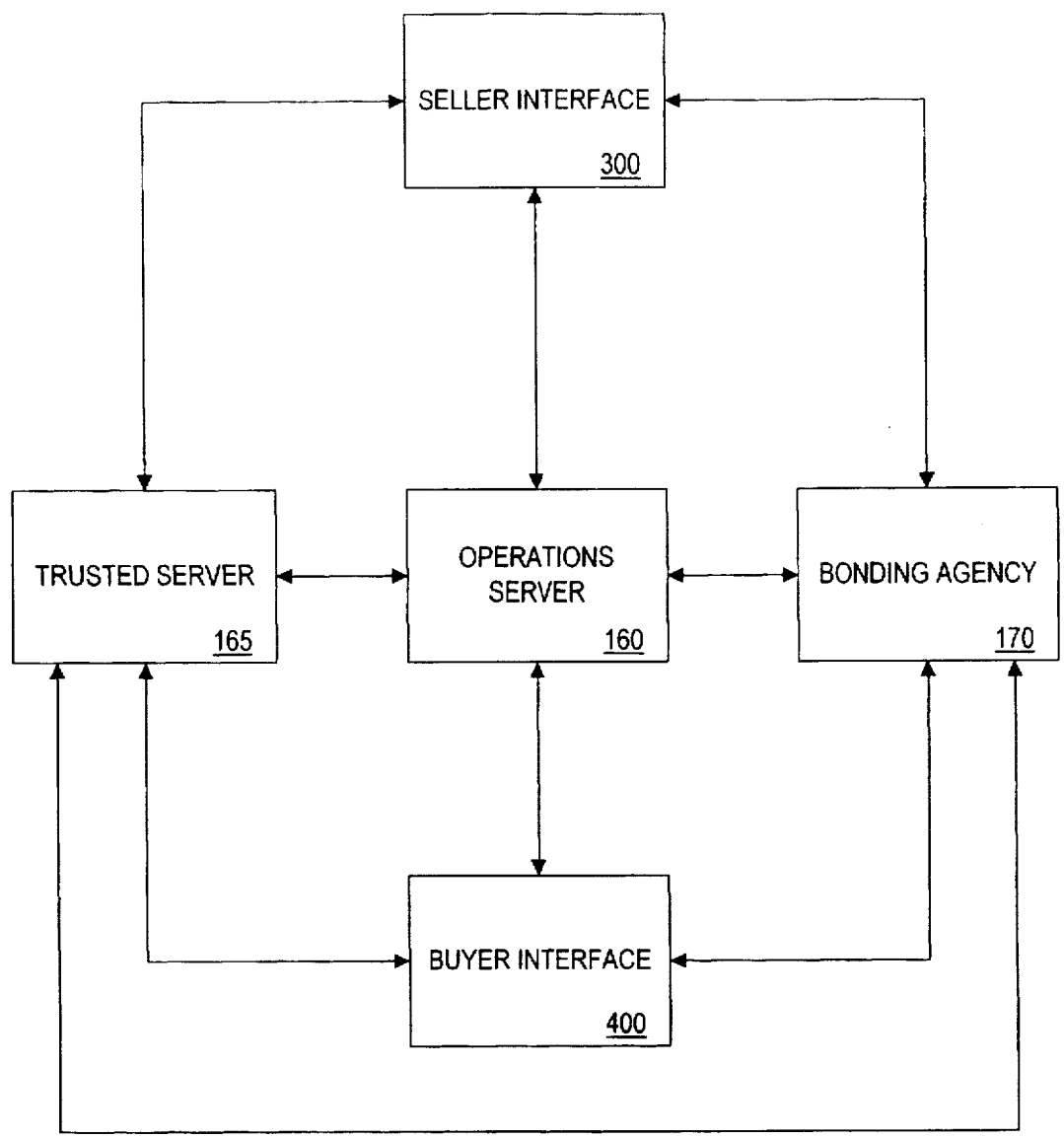
FIG. 20 illustrates an embodiment showing the use of a trusted server and a bonding agency.

In one embodiment of the present invention, central controller 200 is separated into three distinct elements: operations server 160, trusted server 165, and bonding agency 170. Each server performs a distinct task in the process of managing CPO 100. This separation makes it more difficult for attackers to compromise the system, as they must defeat the security of three separate systems instead of one. As indicated in FIG. 20, these servers work in conjunction with buyer interface 400 and seller interface 300. Operations server 160 has the task of posting CPOs 100, and accepts all transactions previously authenticated by trusted server 165. Trusted server 165 authenticates the identity of buyers and sellers, while bonding agency 170 verifies the ability of buyers to pay and the ability of sellers to deliver on bound CPOs 100. In this embodiment, each server type may be distributed over a number of servers.

The following protocols describe the interactions of the three servers and assume the following:

1. Everyone knows the public keys of operations server 160, trusted server 165, and bonding agency 170.
2. The buyer and potential seller have bond certificates 172, as discussed below.
3. Public keys can be used both for encryption and for signing.

Before CPO 100 is accepted by operations server 160, it must bear the digital signature of both trusted server 165 and bonding agency 170. Because of this, CPO 100 contains two additional elements—a trusted server ID and a bond certificate.

The trusted server ID is the ID number of the trusted server 165 which authenticated the buyer who created CPO 100. The "bond certificate" is a public key certificate, with the certifier (bonding agency 170) specifying a set of valid dates for bond certificate 172, a limit to the amount covered, and a set of additional conditions. These additional conditions may require on-line checking of a revocation list, may specify operations server 160 and trusted server 165 to be used, etc. The private key corresponding to the public key certified is not known to bonding agency 170—only to the user. Knowledge of that private key is used as proof of identity for the bondholder. (This allows buyer and seller anonymity in many cases, though of course, neither will be anonymous to bonding agency 170 except in very special cases.)

Bond certificate 172 for the buyer will be referred to as $BC_B$, while the corresponding public and private keys will be referred to as $PK_B$ and $SK_B$, respectively.

CPO 100 is posted by an interaction between the buyer, trusted server 165, and operations server 160. This part of the protocol is possible with nothing more than encrypted e-mail transmitted among the parties.

Before CPO 100 may be posted, the buyer must get approval from trusted server 165. This is required so that both the buyer and operations server 160 know that trusted server 165 they've designated to decide whether or not the contract has been fulfilled is actually willing to accept CPO 100. Operations server 160 will not accept CPO 100 without a TRUSTED_ACCEPTANCE message as described below.

The trusted server 165, in turn, will not issue a TRUSTED_ACCEPTANCE unless it is convinced that the buyer's CPO 100 is fresh (not a replay), and that the buyer's ability to pay is guaranteed by bonding agency 170. The buyer must also be convinced that he is being issued a fresh TRUSTED_ACCEPTANCE.

The protocol works as follows:

1. The buyer forms
   $U_0$="REQUEST FOR TRUSTED APPROVAL"
   $X_0=U_0$, CPO, $R_0$, Additional Terms and sends to trusted server 165
   $M_0=PKE_{PK_A}(X_0, Sign_{SK_B}(X_0))$.
2. Trusted server 165 responds with
   $U_1$="TRUSTED CPO CHALLENGE"
   $R_1$=a 160-bit random number
   $X_1=U_1$ hash $(X_0)$, $R_1$ and sends to the buyer
   $M_1=PKE_{PK_B}(X_1, Sign_{SK_A}(X_1))$.
3. The buyer responds to this with
   $U_2$="BUYER CPO RESPONSE"
   $X_2=U_2$, hash $(X_1)$ and sends to trusted server 165
   $M_2=PKE_{PK_A}(X_2, Sign_{SK_B}(X_2))$.
4. Trusted server 165 responds with
   $U_3$="TRUSTED CPO ACCEPTANCE"
   $T_3$=Timestamp
   $X_3=U_3$, hash $(X_2)$, $T_3$, CPO and sends to the buyer
   $M_3=PKE_{PK_B}(X_3, Sign_{SK_A}(X_3))$.
5. The buyer stores $X_3$ as TRUSTED_ACCEPTANCE.

In order for operations server 160 to post CPO 100, it must be convinced that CPO 100 has a fresh TRUSTED_ACCEPTANCE, and that it is guaranteed by bonding agency 170. This works as follows:

1. The buyer forms
   $R_0$=random 160-bit number
   $U_0$="CPO SERVER SUBMISSION"
   $X_0=U_0$, $R_0$, TRUSTED_ACCEPTANCE and then sends to operations server 160
   $M_0=PKE_{PK_S}(X_0, Sign_{SK_B}(X_0))$.
2. Operations server 160 receives $M_0$ and verifies it. If it's fresh (not a replay), and if operations server 160 is willing to post CPO 100, it forms
   $R_1$=a random 160-bit number
   $U_1$="SERVER CPO CHALLENGE"
   $X_1=U_1$, hash $(X_0)$, $R_1$ and then encrypts and sends to the buyer
   $M_1=PKE_{PK_B}(X_1, Sign_{SK_S}(X_1))$.
3. The buyer forms
   $U_2$="CPO RESPONSE TO SERVER CHALLENGE" and then sends to operations server 160
   $M_2=PRE_{PK_S}(X_2, Sign_{SK_B}(X_2))$
4. If this message's signature verifies properly, then operationsserver 160 posts the CPO. Operations server 160 forms
   $U_3$="POSTED CPO RECEIPT"
   CPO=$U_3$, hash$(X_2)$, CPO.
   It then sends to the buyer $M_3 = PKE_{PK_p}(CPO, Sign_{SK_s}(CPO))$.

At the end of this protocol, the buyer has a receipt to acknowledge that his CPO 100 has been posted, and operations server 160 is convinced that the holder of bond certificate 172 has just agreed to CPO 100, and has the approval of trusted server 165.

The potential seller has a bonding certificate 172 ($BC_P$) of his own. Before he is allowed to browse CPOs 100 in real time (with the ability to bind them), he must go through a protocol. (CPOs 100 may be available to people who aren't browsing, but nobody is allowed to bind CPOs 100 until they go through this protocol.) The purpose of this protocol is to prove that the seller is guaranteed by bonding agency 170 to be capable of delivering the required goods, and also to decrease the computational load on operations server 160 by establishing a secret authentication key, $K_p$. All of this decreases the computational expense of allowing the potential seller to browse CPOs 100.

1. The potential seller forms
   $R_0$=a random 160-bit number
   T=a time range
   $U_0$="REQUEST FOR ACCESS TO BROWSE"
   $X_0=U_0, R_0, T, BC_P$ and sends to operations server 160
   $M_0=PKE_{PK_s}(X_0, Sign_{SK_p}(X_0))$
2. Operations server 160 decides whether to grant the potential seller access. If so, it forms
   $R_1$=a random 160-bit number
   $U_1$="SERVER BROWSE-ACCESS CHALLENGE"
   $X_1=U_1$, hash ($X_0$), $R_1$ and sends to the potential seller.
   $M_1=PKE_{PK_p}(X_1, Sign_{SK_s}(X_1))$.
3. The potential seller responds by forming
   $U_2$="BROWSE-ACCESS RESPONSE" and sends to operations server 160
   $M_2=PKE_{PK_s}(X_2, Sign_{SK_p}(X_2))$.
4. Operations server 160 verifies the signature, and then responds by forming
   $U_3$="BINDING KEY"
   $K_p$=a random secret key to be used for binding CPOs 100.
   T=a time range (from first protocol message)
   $X_3=U_3$, hash ($X_2$), T, $K_p$ and sends to the potential seller
   $M_3=PKE_{PK_p}(X_3, Sign_{SK_s}(X_3))$.

At the end of this protocol, the potential seller holds the secret shared key with which he is allowed to bind CPO 100, within the time limits specified in the last message. The potential seller and operations server 160 are both convinced that they have interacted with one another in real-time, and operations server 160 knows that the potential seller's capacity to deliver on bound CPOs 100 are guaranteed by bonding agency 170.

As the potential seller browses CPOs 100, each is sent to him by operations server 160, authenticated under $K_p$, and including a random challenge to prevent replay attacks. When the potential seller wants to bind one, he forms an offer to bind CPO 100, and sends it, along with the hash of the authenticated CPO 100, authenticated under $K_p$. Operations server 160 is convinced that this is a valid offer to bind CPO 100, and that it's happening in real time. It responds by sending him BOUND_CPO.

1. Operations server 160 forms
   $U_0$="CPO OFFER"
   $R_0$=a random 160-bit number,
   $X_0=U_0, R_0$, CPO description and sends the potential seller
   $M_0=PKE_{PK_p}(X_0, Auth_{K_p}(X0))$. (Note that this step is repeated for each CPO 100 browsed.)
2. The potential seller forms
   $U_1$="CPO OFFER TO BIND"
   $R_1$=a random 160-bit number
   $X_1=U_1$, hash ($X_0$), $R_1$, Offer Details and encrypts and sends to operations server 160
   $M_1=PKE_{PK_s}(X_1, Auth_{K_p}(X_1))$.
3. If the offer is acceptable to operations server 160, then it forms
   $U_2$="SERVER BINDING OF CPO"
   T=timestamp
   $X_2=U_2$, hash ($X_1$), $BC_P$, T, CPO, Offer Details and encrypts and sends to the potential seller
   $M_2=PKE_{PK_p}(X_2, Sign_{SK_s}(X_2))$
4. The potential seller stores $X_2$, $Sign_{SK_s}(X_2)$ as BOUND_CPO.

The "Offer Details" field of BOUND CPO specifies the conditions of CPO 100. In most cases, this will involve delivering some goods in exchange for payment, possibly in the presence of an agent from trusted server 165. In some cases, however, this will involve intermediaries, to preserve anonymity for the potential buyer, the seller, or both. it is important that the potential seller has the BOUND_CPO so that he can prove his identity to the buyer or an intermediary with a simple challenge-response protocol.

This set of protocols describes one possible implementation of an infrastructure to support CPOs 100. It is important to note that operations server 160, trusted server 165, and bonding agency 170 can conceivably be the same entity. In this case, these protocols can be dramatically simplified.

Barter Embodiment

Not all transactions require the transfer of money from buyer to seller. In a barter transaction the distinction between buyer and seller disappears, resulting in a contract between a first party and a second party. The first party posts CPO 100, and the second party binds it. Instead of getting cash, the second party receives goods from the first party. A first party who wanted to get rid of a motorcycle, for example, could post CPO 100 in which he offered to exchange the motorcycle for a first class ticket from New York to London.

Arbitration Protocols

Although the previous embodiments have described the delivery of goods from seller to buyer as the end of the process, there will inevitably be disputes arising from some transactions, requiring follow-up activity to resolve these disputes. The present invention can support dispute resolution in two ways.

First, language can be built into every CPO 100 requiring that both parties submit to binding arbitration of all disputes, helping to avoid more costly and time consuming legal battles in a court of law. Additionally, liquidated damages may be set which specify damage amounts for particular infractions of CPO 100.

Second, central controller 200 can support the arbitration process by providing an arbiter for each dispute. Such arbitration might be required when goods shipped from the seller do not correspond to the conditions of CPO 100. A buyer seeking a non-stop airline ticket, for example, might seek damages against a seller who delivered a ticket with one or more stops. Similarly, a business traveler whose CPO 100 for a non-smoking hotel room might seek damages from the hotel which bound the CPO with a smoking room. Instead of seeking damages, the buyer may seek replacement of the goods, such as another airline ticket that was non-stop. In an arbitration involving airline tickets, the buyer may submit a copy of the ticket to central controller 200 along with the tracking number of CPO 100, allowing the arbiter to establish whether or not the seller fulfilled the conditions of CPO 100. Sellers may also initiate arbitration proceedings if they have shipped the goods and have not yet received payment from the buyer.

In an alternative embodiment, transaction data can be sent to third party arbiters outside the system. Central controller 200 may send a copy of CPO 100, seller response 110, and purchase confirmation 120 to the arbiters. Cryptographic keys may also be provided to the arbiters if there are questions of authenticity or non-repudiation.

Applications of the Invention

In order to clarify the application of the present invention, the following examples demonstrate potential needs of end users:

CPO: Airline tickets
 Four tickets needed
 From Chicago, O'Hare or Midway to Phoenix.
 Leaving on April 12 or 13
 Returning on April 18 or 19.
 Any of the six largest carriers acceptable.
 Change of planes is acceptable if layover is less than 2 hours.
 I'll bind at $180 per ticket, excluding tax.

CPO: Hotel accommodations
 Five nights lodging
 Arrive April 12 or 13, Depart April 18 or 19
 Within 30 minutes drive time of downtown Phoenix.
 Double bed
 Non-smoking
 Hotels, motels or bed & breakfasts are acceptable
 Must be AAA approved or Mobil 2* or better.
 I'll bind at $55 per night (excluding tax).

CPO: New car purchase
 1997 Ford Taurus
 Must be in dealer stock
 GL package w/air conditioning
 AM/FM/Cassette (Stock #1224-099)
 May have other options already installed
 Can be white, tan, green or maroon
 Must have 100 miles or less, never titled.
 No dealer demo cars
 Delivered to me no later than Jul. 15, 1996
 Loan pre-approval: Chase Manhattan #1220-998-887AD-21
 I'll bind at $21,350

CPO: Car insurance
 1997 Ford Taurus
 1 driver, age 40, male
 Reside in Ridgefield, Conn.
 Drive to work 30 miles
 Collision included
 $500 deductible
 Glass coverage included
 No speeding infractions in last 3 years
 No accident in past 3 years
 1MM liability umbrella
 Driver's license # Conn. 1222-221-2298
 Carrier must be rated A or better by AM Best.
 I'll bind at $1,200 per year CPO: U.S. silver dollars
 1886 Morgan
 Philadelphia mint mark
 Sealed in ANA packaging
 MS94 or better grade
 I will purchase up to 6 total
 Sellers may fulfill all or part of order
 I'll bind at $225 each Offer Administrator: Coinworld, P.O. Box 1000, N.Y., N.Y. Mr. K. Smith 212-222-1000

CPO: Industrial commodity
 My company wants to purchase 40 tons of steel
 Grade 120
 Delivered FOB to NY, N.Y.
 Class 4 Slabs or Class 12 ingots
 Alloy RT-12 or equivalent
 Deliver by Aug. 1, 1996
 Maximum price known to Citibank
 First bid below maximum will bind
 Citibank to provide instant price verification
 1 bid per supplier per day (GMT)
 E-mail @ metals.biddesk4022Citi.com
 Letter of Credit payment, Citibank 100-887-9877

CPO: Credit Card Application
 VISA Gold Card
 Credit line $5,000
 Interest rate 12% or lower
 I'll bind at $10 per year
 Financial history available at http://www.provider/~shapiro23

CPO: Reward for Return
 Briefcase lost with important computer disks inside
 Disks labeled RT-554 IBM
 Case is brown leather, brass snaps, RL monogram
 Left on NYC subway, Apr. 7, 1996 F Train.
 I'll bind at $500
 Provide lost & found receipt # to claim reward
 Offer Administrator: NYC Police Lost & Found
 Mr. K. Smith 212-555-1000

Those skilled in the art will recognize that the method and apparatus of the present invention has many applications, and that the present invention is not limited to the representative examples disclosed herein. Moreover, the scope of the present invention covers conventionally known variations and modifications to the system components described herein, as would be known by those skilled in the art.

What is claimed:

1. A method for using a computer to facilitate a transaction between a buyer and at least one of sellers, comprising:
 inputting into the computer a conditional purchase offer which includes an offer price;
 inputting into the computer a payment identifier specifying a credit card account, the payment identifier being associated with the conditional purchase offer;
 outputting the conditional purchase offer to the plurality of sellers after receiving the payment identifier;
 inputting into the computer an acceptance from a seller, the acceptance being responsive to the conditional purchase offer; and
 providing a payment to the seller by using the payment identifier.

2. The method of claim 1, in which the step of inputting into the computer an acceptance comprises:
 inputting into the computer an acceptance from each member of a set of sellers, the set of sellers comprising at least one seller, each acceptance being responsive to the conditional purchase offer;
and further comprising:
 selecting one received acceptance, thereby determining a selected seller of the set of sellers;
 and in which the step of providing a payment comprises:
 providing a payment to the selected seller by using the payment identifier.

3. The method of claim 2, in which the step of selecting one received acceptance comprises:

determining a first received acceptance, thereby determining a first seller of the set of sellers;

and in which the step of providing a payment comprises:
providing a payment to the first seller by using the payment identifier.

4. The method of claim 1, further comprising:
determining if a predetermined amount is available in the credit card account.

5. The method of claim 1, in which the step of providing a payment comprises:
transferring payment from the buyer to the selected seller.

6. The method of claim 1, in which the step of providing a payment comprises:
transmitting the payment identifier to the selected seller.

7. The method of claim 1, further comprising:
outputting to the buyer a request for an authorization to use the payment identifier to provide payment it an acceptance is received; and
inputting into the computer the authorization from the buyer in response to the request.

8. The method of claim 1, in which the step of inputting into the computer an acceptance comprises:
inputting into the computer an acceptance from each of a set of sellers.

9. The method of claim 1 in which the conditional purchase offer includes an expiration date and is non-revocable prior to the expiration date.

10. The method of claim 1, further comprising:
determining an active period during which the conditional purchase offer is active;
and in which the step of inputting into the computer an acceptance is performed during the active period.

11. The method of claim 1, further comprising:
inputting into the computer a revocation of the conditional purchase offer after the step of receiving an acceptance;
and in which the step of providing a payment comprises:
providing a payment of a predetermined amount to the seller.

12. An apparatus for facilitating a transaction between a buyer and at least one of a plurality of sellers, comprising:
a storage device; and
a processor connected to the storage device,
the storage device storing
a program for controlling the processor; and
the processor operative with the program to receive a conditional purchase offer which includes an offer price;
receive a payment identifier specifying a credit card account, the payment identifier being associated with the conditional purchase offer;
make the conditional purchase offer available to the plurality of sellers after receiving the payment identifier;
receive an acceptance from a seller, the acceptance being responsive to the conditional purchase offer; and
provide payment to the seller by using the payment identifier.

13. The apparatus of claim 12, in which the processor is further operative with the program to:
receive an acceptance from each member of a set of sellers, the set of sellers comprising at least one seller, each acceptance being responsive to the conditional purchase offer;
select one received acceptance, thereby determining a selected seller of the set of sellers; and
provide a payment to the selected seller by using the payment identifier.

14. The apparatus of claim 13, in which the processor is further operative with the program to:
determine a first acceptance received, thereby determining a first seller of the set of sellers; and
provide a payment to the first seller by using the payment identifier.

15. The apparatus of claim 12, in which the processor is further operative with the program to:
determine if a predetermined amount is available in the credit card account.

16. The apparatus of claim 21, in which the processor is further operative with the program to:
transfer payment from the buyer to the seller.

17. The apparatus of claim 12, in which the processor is further operative with the program to:
transmit the payment identifier to the seller.

18. The apparatus of claim 12, in which the processor is further operative with the program to:
output to the buyer a request for an authorization to use the payment identifier to provide payment if an acceptance is received; and
receive the authorization from the buyer in response to the request.

19. The apparatus of claim 12, in which the processor is further operative with the program to:
receive an acceptance from each of a set of sellers.

20. The apparatus of claim 12, in which the conditional purchase offer includes an expiration date and is non-revocable prior to the expiration date.

21. The apparatus of claim 12, in which the processor is further operative with the program to:
determine an active period during which the conditional purchase offer is active; and
receive an acceptance during the active period.

22. The apparatus of claim 12, in which the processor is further operative with the program to:
receive a revocation of the conditional purchase offer after receiving an acceptance; and
provide a payment of a predetermined amount to the seller.

23. A method for using a computer to facilitate a transaction between a buyer and at least one of a plurality of sellers, comprising:
inputting into the computer a conditional purchase offer which includes an offer price;
inputting into the computer a payment identifier specifying a financial account, the payment identifier being associated with the conditional purchase offer;
outputting to the buyer a request for authorization to use the payment identifier to provide a payment it an acceptance is received;
inputting into the computer authorization from the buyer in response to the request;
outputting the conditional purchase offer to the plurality of sellers after receiving the payment identifier;
inputting into the computer an acceptance from a seller, the acceptance being responsive to the conditional purchase offer; and providing the payment to the seller by using the payment identifier.

24. The method of claim 23, in which the step of inputting into the computer an acceptance comprises:

inputting into the computer an acceptance from each member of a set of sellers, the set of sellers comprising at least one seller, each acceptance being responsive to the conditional purchase offer;

and further comprising;

selecting one received acceptance, thereby determining a selected seller of the set of sellers;

and in which the step of providing a payment comprises:

providing a payment to the selected seller by using the payment identifier.

25. The method of claim 24, in which the step of selecting an acceptance received comprises:

determining a first acceptance received, thereby determining a first seller of the at least one seller;

and in which the step of providing a payment comprises:

providing a payment to the first seller by using the payment identifier.

26. The method of claim 23, in which the financial account is a credit card account.

27. The method of claim 26, further comprising:

determining if a predetermined amount is available in the credit card account.

28. The method of claim 23, farther comprising:

transferring payment from the buyer to the seller.

29. The method of claim 23 in which the step of providing a payment comprises:

transmitting the payment identifier to the seller.

30. The method of claim 23, in which the step of inputting into the computer an acceptance comprises:

inputting into the computer an acceptance from each of a set of sellers.

31. The method of claim 23, in which the conditional purchase offer includes an expiration date and is non-revocable prior to the expiration date.

32. The method of claim 23, further comprising:

determining an active period during which the conditional purchase offer is active; and in which the step of inputting into the computer an acceptance is performed during the active period.

33. The method of claim 23, further comprising:

inputting into the computer a revocation of the conditional purchase offer after the step of receiving an acceptance; and in which the step of providing a payment comprises:

providing a payment of a predetermined amount to the seller.

34. An apparatus for facilitating a transaction between a buyer and at least one of a plurality of sellers, comprising:

a storage device; and a processor connected to the storage device, the storage device storing a program for controlling the processor; and the processor operative with the program to receive a conditional purchase offer which includes an offer price;

receive a payment identifier specifying a financial account, the payment identifier being associated with the conditional purchase offer;

output to the buyer a request for an authorization to use the payment identifier to provide a payment if an acceptance is received;

receive the authorization from the buyer in response to the request;

transmit the conditional purchase otter to the plurality of sellers after receiving the payment identifier;

receive an acceptance from a seller, the acceptance being responsive to the transmitted conditional purchase offer; and provide the payment to the seller by using the payment identifier.

35. The apparatus of claim 34, in which the processor is further operative with the program to:

receive an acceptance from each member of a set of sellers, the set of sellers comprising at least one seller, each acceptance being responsive to the conditional purchase offer;

select one received acceptance, thereby determining a selected seller of the set of sellers; and provide a payment to the selected seller by using the payment identifier.

36. The apparatus of claim 35, in which the processor is further operative with the program to:

determine a first acceptance received, thereby determining a first seller of the set of sellers; and provide a payment to the first seller by using the payment identifier.

37. The apparatus of claim 34, in which the financial account is a credit card account.

38. The apparatus of claim 37, in which the processor is further operative with the program to:

determine if a predetermined amount is available in the financial account.

39. The apparatus of claim 34, in which the processor is further operative with the program to:

transfer payment from the buyer to the seller.

40. The apparatus of claim 34, in which the processor is further operative with the program to:

transmit the payment identifier to the seller.

41. The apparatus of claim 34, in which the processor is further operative with the program to:

receive an acceptance from each of a set of sellers.

42. The apparatus of claim 34, in which the conditional purchase offer includes an expiration date and is non-revocable prior to the expiration date.

43. The apparatus of claim 34, in which the processor is further operative with the program to:

determine an active period during which the conditional purchase offer is active; and receive an acceptance during the active period.

44. The apparatus of claim 34, in which the processor is further operative with the program to:

receive a revocation of the conditional purchase offer after receiving an acceptance; and provide a payment of a predetermined amount to the seller.

* * * * *

UNITED STATES PATENT AND TRADEMARK OFFICE
CERTIFICATE OF CORRECTION

PATENT NO. : 5,794,207
DATED : August 11, 1998
INVENTOR(S) : Jay S. Walker et al.

It is certified that error appears in the above-identified patent and that said Letters Patent is hereby corrected as shown below:

In col. 26, line 10, please delete "1 0" and insert therefor -- 110 --.

In claim 1, col. 32, line 41, after "at least one of", please insert -- a plurality of --.

In claim 7, col. 33, line 19, please delete "it" and insert therefor -- if --.

In claim 9, col. 33, line 27, after "claim 1", please insert -- , --.

In claim 16, col. 34, line 17, please delete "21" and insert therefor -- 12 --.

In claim 23, col. 34, line 59, please delete "it" and insert therefor -- if --.

In claim 34, col. 36, line 9, please delete "otter" and insert therefor -- offer --.

Signed and Sealed this

Twenty-second Day of June, 1999

Q. TODD DICKINSON

*Attest:*

*Attesting Officer*   Acting Commissioner of Patents and Trademarks